(12) United States Patent
Alcala Perez et al.

(10) Patent No.: US 10,558,227 B2
(45) Date of Patent: Feb. 11, 2020

(54) SYSTEM AND METHOD FOR OUTPUT COMPENSATION IN FLOW SENSORS USING PULSE WIDTH MODULATION

(71) Applicant: Johnson Controls Technology Company, Auburn Hills, MI (US)

(72) Inventors: Carlos Felipe Alcala Perez, Milwaukee, WI (US); Kirk H. Drees, Cedarburg, WI (US); Timothy I. Salsbury, Mequon, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 59 days.

(21) Appl. No.: 15/908,041

(22) Filed: Feb. 28, 2018

(65) Prior Publication Data
US 2019/0250647 A1 Aug. 15, 2019

Related U.S. Application Data

(63) Continuation-in-part of application No. 15/897,987, filed on Feb. 15, 2018.

(51) Int. Cl.
*F16K 31/02* (2006.01)
*G05D 7/06* (2006.01)
(Continued)

(52) U.S. Cl.
CPC ............ *G05D 7/0635* (2013.01); *F24F 11/74* (2018.01); *G05D 7/0623* (2013.01); *F24F 2140/40* (2018.01)

(58) Field of Classification Search
CPC ..... G05D 7/0635; G05D 7/0623; F24F 11/74; F24F 11/62; F24F 11/30; F24F 13/10;
(Continued)

(56) References Cited

U.S. PATENT DOCUMENTS 4,796,651 A * 1/1989 Ginn .................. G01F 1/22
137/487
5,146,941 A 9/1992 Statler
(Continued)

FOREIGN PATENT DOCUMENTS

EP 3 200 041 A1 8/2017
EP 3 483 690 A1 5/2019

OTHER PUBLICATIONS

Federspiel, Flow Control with Electric Actuators, HVAC&R Research, 3(3), Jul. 1997, 26 pages.
(Continued)

*Primary Examiner* — Minh Q Le
(74) *Attorney, Agent, or Firm* — Foley & Lardner LLP

(57) ABSTRACT

A system for monitoring and controlling flow rate of a fluid through a valve is disclosed. The system includes a flow rate sensor to measure the flow rate of the fluid through the valve, and a controller. The controller is configured to receive the measured flow rate from the flow rate sensor, and determine if the measured flow rate is equal to a predetermined flow rate value. The controller is further configured to, in response to a determination that the measured flow rate is equal to the predetermined flow rate value, determine a minimum valve position threshold ($x_{min}$). Additionally, the controller is configured to determine a minimum flow rate threshold ($y_{min}$) corresponding to $x_{min}$, and configured to generate a PWM signal and calculate a corrected flow rate ($\hat{y}_f$) using the PWM signal. The controller controls a valve operation using $\hat{y}_f$. The PWM signal switches between zero and $y_{min}$.

20 Claims, 29 Drawing Sheets

(51) Int. Cl.
*F24F 11/74* (2018.01)
*F24F 140/40* (2018.01)

(58) Field of Classification Search
CPC .............. F24F 2110/40; F24F 2110/10; F24F 2140/40; G01F 1/34; G01F 25/00
USPC ...................................................... 137/487.5
See application file for complete search history.

(56) References Cited

U.S. PATENT DOCUMENTS

| | | | |
|---|---|---|---|
| 6,827,100 | B1 | 12/2004 | Carlson |
| 6,964,279 | B2* | 11/2005 | Ohmi .................... G05D 7/0635 137/486 |
| 7,610,117 | B2 | 10/2009 | Brodeur et al. |
| 8,109,289 | B2 | 2/2012 | Trnka et al. |
| 8,307,845 | B2 | 11/2012 | Kouchi et al. |
| 8,825,185 | B2 | 9/2014 | Salsbury |
| 9,121,510 | B2 | 9/2015 | Volovec |
| 9,746,199 | B1 | 8/2017 | Drees et al. |
| 2005/0189018 | A1 | 9/2005 | Brodeur et al. |
| 2006/0124173 | A1* | 6/2006 | An ....................... G05D 7/0635 137/487.5 |
| 2008/0103680 | A1 | 5/2008 | Jacobson et al. |
| 2012/0247584 | A1* | 10/2012 | Goto .................... G05D 7/0635 137/487.5 |
| 2013/0037112 | A1 | 2/2013 | Smirnov |
| 2013/0068313 | A1* | 3/2013 | George ............... F16K 37/0041 137/14 |
| 2013/0092257 | A1* | 4/2013 | Yasuda ................ G01F 25/0053 137/487 |
| 2013/0146148 | A1* | 6/2013 | Smirnov .................. F17D 1/16 137/13 |
| 2013/0186486 | A1 | 7/2013 | Ding |
| 2015/0177745 | A1 | 6/2015 | Chen et al. |
| 2015/0277446 | A1* | 10/2015 | Peczalski ............. G05D 7/0635 137/1 |
| 2015/0308579 | A1 | 10/2015 | Hagmann |
| 2016/0131381 | A1 | 5/2016 | Schmidlin |
| 2017/0003150 | A1 | 1/2017 | Noboa et al. |
| 2017/0010625 | A1* | 1/2017 | Monkowski .............. G01F 1/34 |
| 2017/0198825 | A1 | 7/2017 | Tuineag |
| 2018/0274956 | A1* | 9/2018 | Miller ..................... G01F 1/363 |

OTHER PUBLICATIONS

Salisbury, A New Pulse Modulation Adaptive Controller (PMAC) Applied to HVAC Systems, Control Engineering Practice, 10(12), 2002, 14 pages.
Seem, A New Pattern Recognition Adaptive Controller with Application to HVAC Systems, Automatica, 34(8), 1998, 14 pages.
European Search Report on EP 19157158.7 dated Jul. 24, 2019, 11 pages.
European Search Report on EP 19157221.3 dated Jul. 30, 2019, 9 pages.

* cited by examiner

|  | | | |
|---|---|---|---|
| $y_{max}$ | 12 | 15 | 15 |
| $y_{min}$ | 1.2 | 1.5 | 1 |
| $\sigma$ | 0.54 | 0.27 | 0.07 |
FIG. 20A
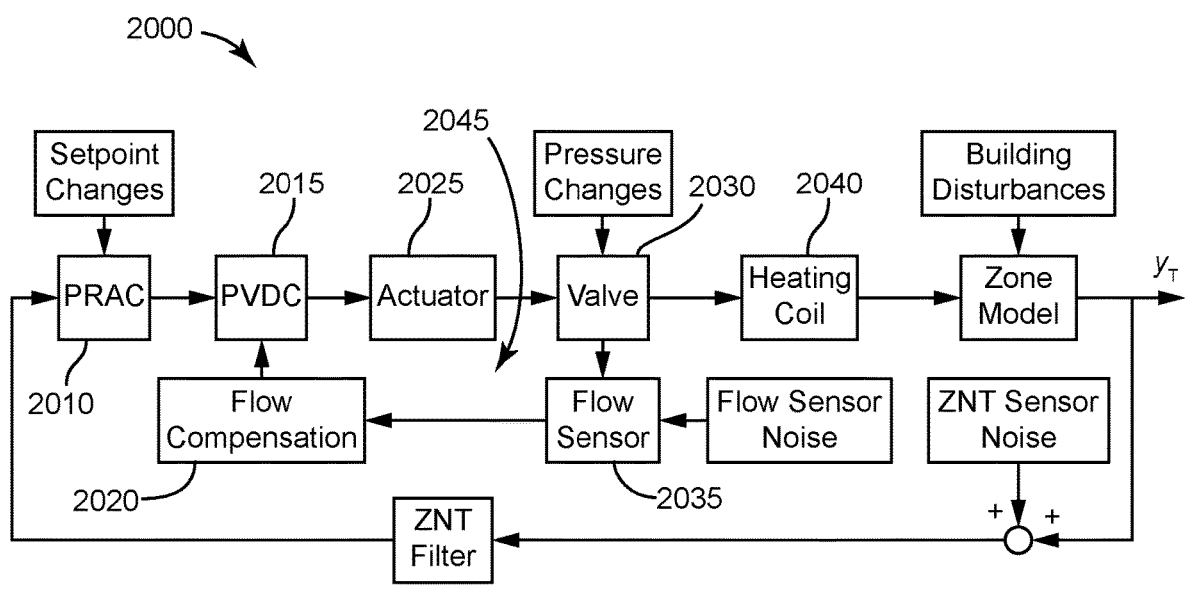
FIG. 20B
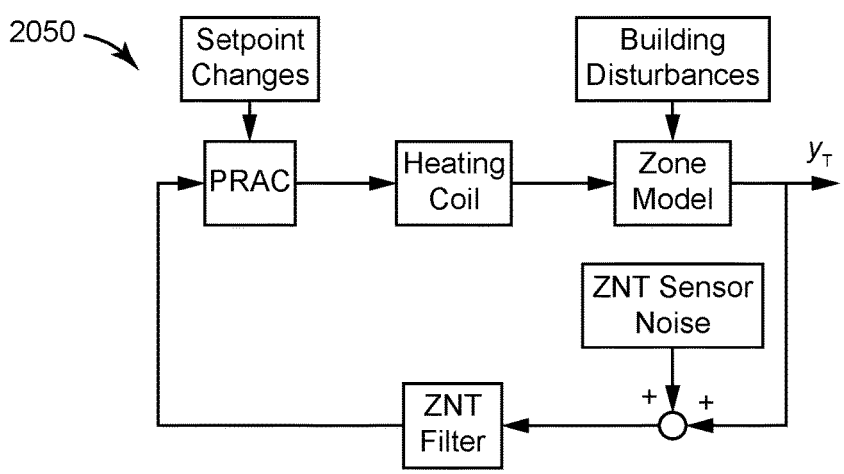
FIG. 20C

SYSTEM AND METHOD FOR OUTPUT COMPENSATION IN FLOW SENSORS USING PULSE WIDTH MODULATION

CROSS-REFERENCE TO RELATED PATENT APPLICATION

This application is a continuation-in-part of U.S. patent application Ser. No. 15/897,987 filed on Feb. 15, 2018, the entire disclosure of which is incorporated by reference herein.

BACKGROUND

The present disclosure relates generally to building management systems and associated devices. More particularly, the present disclosure relates to a controller and actuator with valve control capabilities within an HVAC system.

HVAC actuators are used to operate a wide variety of HVAC components such as air dampers, fluid valves, air handling units, and other components that are typically used in HVAC systems. For example, an actuator may be coupled to a valve, or other movable equipment in an HVAC and may be used to drive the equipment (e.g., the valve) between an open position and a closed position. A conventional actuator includes a motor and a drive device (e.g., a hub, a drive train, etc.) that is driven by the motor and coupled to the HVAC component.

The HVAC industry is moving towards the use of control valves capable of maintaining desired water flows regardless of time-varying pressure conditions in the pipes. Some valves are part of a control loop that includes a flow rate sensor that measures the flow rate and sends a signal to a feedback controller. The feedback controller then sends a signal to an actuator to adjust the opening of the valve to achieve the desired flow rate.

The flow rate sensors in the flow control loops have a working range between a minimum and maximum readable flow at which they are configured to provide reliable flow rate measurements. Therefore, flow rates outside of the working range may be unreliable. Accordingly, it would be advantageous to compensate for when the actual flow rate values are below the minimum readable flow corresponding to the flow rate sensor.

SUMMARY

One implementation of the present disclosure is a system for monitoring and controlling flow rate of a fluid through a valve. The system includes a flow rate sensor configured to measure the flow rate of the fluid through the valve, and a controller in communication with the flow rate sensor. The controller is configured to receive the measured flow rate from the flow rate sensor, and determine if the measured flow rate is equal to a predetermined flow rate value. The controller is further configured to, in response to a determination that the measured flow rate is equal to the predetermined flow rate value, determine a minimum valve position threshold ($x_{min}$). Additionally, the controller is configured to determine a minimum flow rate threshold ($y_{min}$) corresponding to $x_{min}$. The controller is further configured to generate a pulse-width modulated (PWM) signal and calculate a corrected flow rate ($\hat{y}_f$) using the PWM signal. The controller is further configured to control a valve operation using the corrected flow rate ($\hat{y}_f$). The PWM signal is configured to switch between zero and $y_{min}$.

In some embodiments, the PWM signal is equal to zero when a pulse run time ($t_r$) is between a sum of a beginning of a pulse period ($t_k$) and a pulse width ($T_{on}$) and a sum of the beginning of the pulse period ($t_k$) and a pulse period (C). In some embodiments, the PWM signal is equal to $y_{min}$ when the pulse run time ($t_r$) is between the beginning of a pulse period ($t_k$) and a sum of the beginning of the pulse period ($t_k$) and the pulse width ($T_{on}$).

In some embodiments, $T_{on}$ is less than or equal to the pulse period (C). Further, in some embodiments, n is a positive integer and $\tau_a$ is a stroke time corresponding to an actuator, with C equal to $n\tau_a$. Additionally, in some embodiments, n is equal to ten.

In some embodiments of the present disclosure, the controller includes a position detector configured to determine a position of the valve ($x_i$). In some embodiments, the controller is configured to determine a pulse width ($T_{on}$) of the PWM signal, wherein the pulse width ($T_{on}$) is equal to $$\frac{x_i}{x_{min}} C.$$

In some embodiments, the controller includes a position detector configured to determine a position of the valve ($x_i$), and in response to a determination that the measured flow rate is not equal to the predetermined flow rate value, the controller is configured to set $\hat{x}_{min}$ equal to a minimum value of $\hat{x}_{min}$ and $x_i$, and set $x_{min}$ equal to $\hat{x}_{min}$. Additionally, the controller is configured to, in response to a determination that the measured flow rate is equal to the predetermined flow rate value, set $\hat{x}_{min}$ equal to a maximum value of $\hat{x}_{min}$ and $x_i$, and set $x_{min}$ equal to $\hat{x}_{min}$.

One implementation of the present disclosure is a system for monitoring and controlling flow rate of a fluid through a valve. The system includes a valve configured to regulate a flow of a fluid through a conduit, and an actuator coupled to the valve and configured to drive the valve between multiple positions. The system further includes a flow rate sensor configured to measure the flow rate of the fluid through the valve, and a controller in communication with the actuator and the flow rate sensor. The controller is configured to receive the measured flow rate, and determine if the measured flow rate is equal to zero. In response to a determination that the measured flow rate is equal to zero, the controller is configured to determine a minimum valve position threshold ($x_{min}$), and determine a minimum flow rate threshold ($y_{min}$) using $x_{min}$. The controller is further configured to generate a pulse-width modulated (PWM) signal that switches between zero and $y_{min}$, and configured to calculate a corrected flow rate ($\hat{y}_f$) using the PWM signal. In response to a determination that the measured flow rate is greater than zero, the controller is further configured to control a valve operation using the measured flow rate.

In some embodiments, the controller is further configured to determine if $t_k < t_r \leq (t_k + T_{on})$ where $t_k$ is a beginning of a pulse period, $t_r$ is a run time, and $T_{on}$ is a pulse width, and determine if $(t_k + T_{on}) < t_r \leq (t_k + C)$ where C is a pulse period. In response to a determination that $t_k < t_r \leq (t_k + T_{on})$, the controller is configured to set the PWM signal equal to $y_{min}$. In response to a determination that $(t_k + T_{on}) < t_r \leq (t_k + C)$, the controller is configured to set the PWM signal equal to zero.

In some embodiments, n is a positive integer and $\tau_a$ is a stroke time corresponding to an actuator, and C is equal to $n\tau_a$.

In some embodiments, the controller includes a position detector configured to determine a position of the valve ($x_i$). Additionally, in some embodiments, the controller is configured to determine a pulse width ($T_{on}$) of the PWM signal, and the pulse width ($T_{on}$) is equal to $$\frac{x_i}{x_{min}}C$$

and C is a pulse period.

In some embodiments, in response to a determination that the measured flow rate is not equal to 0, the controller is configured to set $\hat{x}_{min}$ equal to a minimum value of $\hat{x}_{min}$ and $x_i$, and set $x_{min}$ equal to $\hat{x}_{min}$. In response to a determination that the measured flow rate is equal to 0, the controller is configured to set $\hat{x}_{min}$ equal to a maximum value of $\hat{x}_{min}$ and $x_i$, and set $x_{min}$ equal to $\hat{x}_{min}$.

One implementation of the present disclosure is a method for monitoring and controlling flow rate of a fluid through a valve. The method includes measuring a flow rate, and determining if the flow rate is equal to zero. In response to a determination that the flow rate is equal to zero, the method includes determining a valve opening position ($x_i$), and determining a minimum valve position threshold ($x_{min}$). The method further includes determining a minimum flow rate threshold ($y_{min}$) corresponding to $x_{min}$, and calculating a corrected flow rate ($\hat{y}_f$) using a pulse-width modulated (PWM) signal. Additionally, the method includes controlling a valve operation using the corrected flow rate ($\hat{y}_f$).

In some embodiments, in response to a determination that the flow rate is not equal to zero, the method includes determining an estimated minimum valve position threshold ($\hat{x}_{min}$), and setting $\hat{x}_{min}$ equal to a minimum value of $\hat{x}_{min}$ and $x_i$. In response to a determination that the flow rate is equal to zero, the method includes determining the estimated minimum valve position threshold ($\hat{x}_{min}$), setting $\hat{x}_{min}$ equal to a maximum value of $\hat{x}_{min}$ and $x_i$, and initializing a filtered estimate ($\bar{x}_{min}$) to $\hat{x}_{min}$. The method further includes filtering $\hat{x}_{min}$ using a filtering equation comprising $\bar{x}_{min} = \bar{x}_{min} + e^{-h/\tau_c}(\bar{x}_{min} - \hat{x}_{min})$ where h is a sample rate and $\tau_c$ is a time constant, and setting $\hat{x}_{min}$ equal to $\bar{x}_{min}$. The method further includes setting $x_{min}$ equal to $\hat{x}_{min}$.

In some embodiments, the method further includes determining if $t_k < t_r \leq (t_k + T_{on})$ where $t_k$ is a beginning of a pulse period, $t_r$ is a run time, and $T_{on}$ is a pulse width. The method further includes determining if $(t_k + T_{on}) < t_r \leq (t_k + C)$ where C is a pulse period. In response to a determination that $t_k < t_r \leq (t_k + T_{on})$, the method includes setting the PWM signal equal to $y_{min}$. In response to a determination that $(t_k + T_{on}) < t_r \leq (t_k + C)$, the method includes setting the PWM signal equal to zero. In some embodiments, the pulse width ($T_{on}$) is equal to $$\frac{x_i}{x_{min}}C.$$

Further, in some embodiments, n is a positive integer and $\tau_a$ is a stroke time corresponding to an actuator, and C is equal to $n\tau_a$.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 20A is a table of flow rate sensor parameters used in an example simulation, according to some embodiments.

FIG. 20B is a block diagram of the example simulation of FIG. 20A, according to some embodiments.

FIG. 20C is a block diagram of a simulation corresponding to a benchmark system, according to some embodiments.

DETAILED DESCRIPTION

Overview

Figure 1:
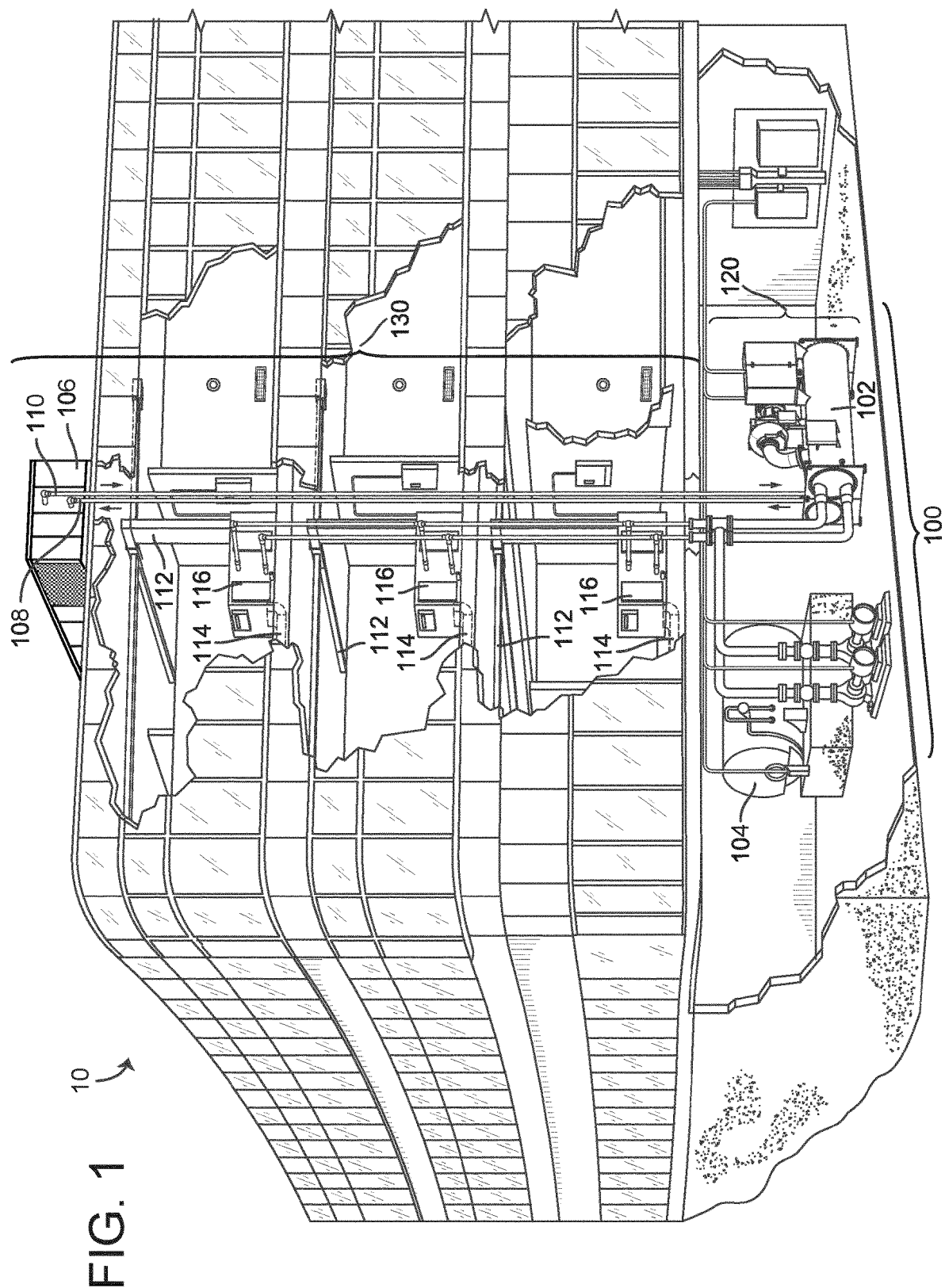
FIG. 1 is a drawing of a building equipped with a HVAC system, according to some embodiments.

Referring generally to the FIGURES, systems and methods for estimating flow rate values are shown, according to various exemplary embodiments. As described above, typical flow rate sensors within flow control loops have a working range extending between a minimum readable flow rate (as used herein, a minimum flow rate threshold) and a maximum readable flow rate (as used herein, a maximum rating of a flow sensor). Within the working range, the flow rate sensors are able to provide reliable measurements. However, flow rates measured outside of the working range are considered unreliable. For example, flow rate values below the minimum flow rate threshold ($y_{min}$) read as zero. Conversely, flow rate values above the maximum rating of the flow sensor ($y_{max}$) may read as saturations at the maximum flow. In some situations, the behavior of the flow rate sensors outside of the working range may affect the ability of a flow controller to reach desired flow setpoints.

In practice, the instrumentation of a plant is typically overdesigned. Accordingly, it is very likely that a flow rate sensor be installed with a maximum rating larger than the actual maximum flow rate in the valve. This also means that the flow rate sensor may have a minimum flow rate threshold larger than the actual operational flow rates found in the valve. A large minimum flow rate threshold in the flow rate sensor may make the system uncontrollable if a large portion of the required flow rate is below that value. Accordingly, the present disclosure includes systems and methods for estimating flow rate values outside of the working range corresponding to the flow rate sensor.

The present disclosure includes an algorithm that uses a PWM signal to correct a flow rate value.

In some embodiments, the flow rate sensor output may correspond to a function that produces a standard flow rate measurement if the measurement is non-zero, or a corrected flow rate if the measurement is zero.

In some embodiments, a minimum valve position threshold ($x_{min}$) may be known. In other embodiments ($x_{min}$) may be estimated using various calculations, as discussed in detail below. Similarly, a minimum flow rate threshold ($y_{min}$) may be known or estimated using various calculations, as discussed in detail below. In some situations, it may be beneficial to initialize and/or estimate $y_{min}$ to be $y_{max}$. Alternatively, $y_{min}$ may be initialized and/or estimated to a different value, such as a percentage of $y_{max}$. As one non-limiting example, $y_{min}$ may be initialized and/or estimated to be $0.2y_{max}$.

Advantageously, the systems and methods described herein may enable a flow controller to reach desired flow setpoints, even when the flow rate sensors are measuring outside of the working range. The overall performance of the control system may be improved, as the present disclosure overcomes the issue of having flow rate readings of zero when there is clearly a flow going through the valve. Additional advantages of the present disclosure will become apparent as the various embodiments are described.

Building HVAC Systems and Building Management Systems

Figure 2:
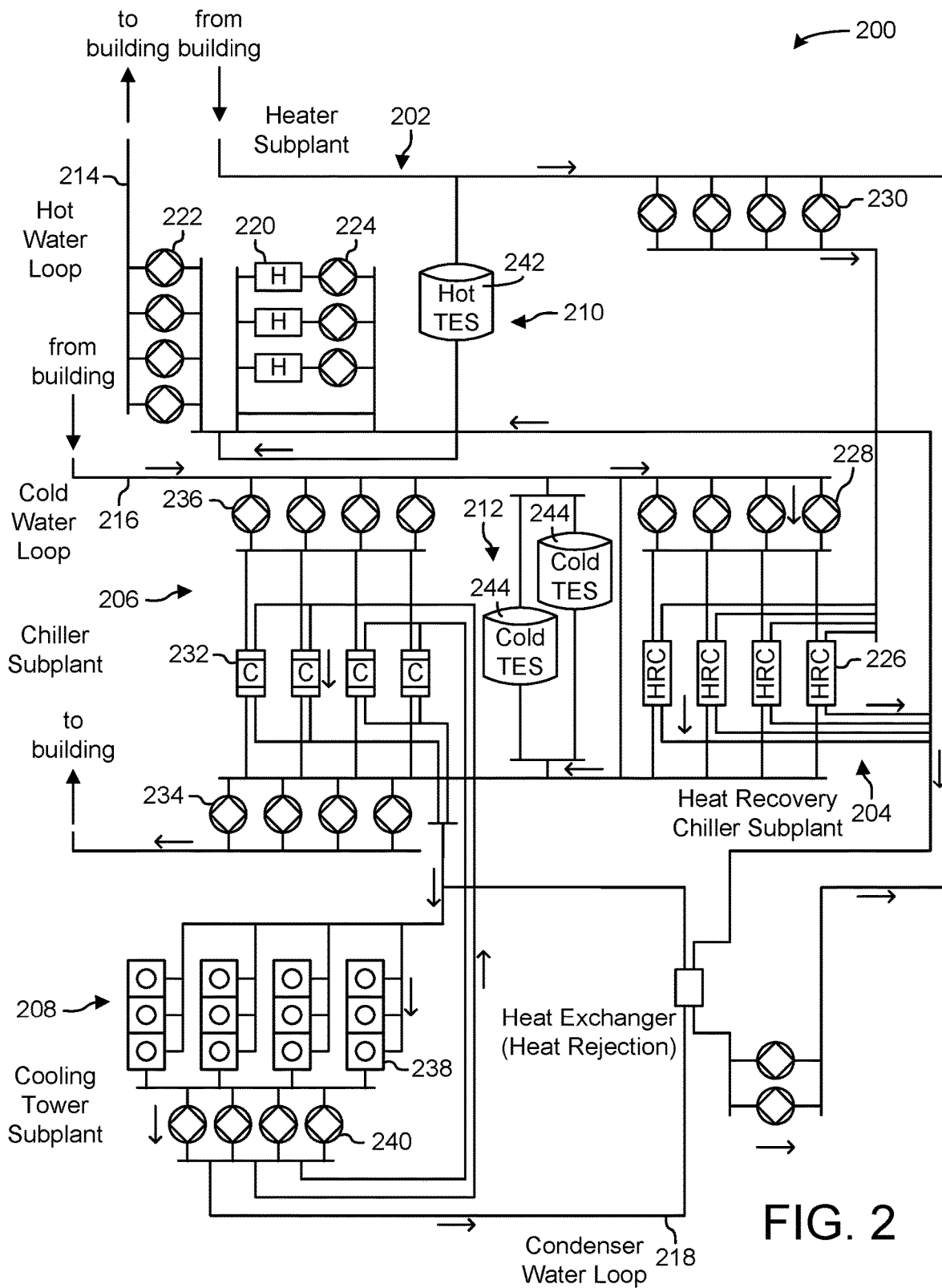
FIG. 2 is a block diagram of a waterside system that may be used in conjunction with the building of FIG. 1, according to some embodiments.
Figure 3:
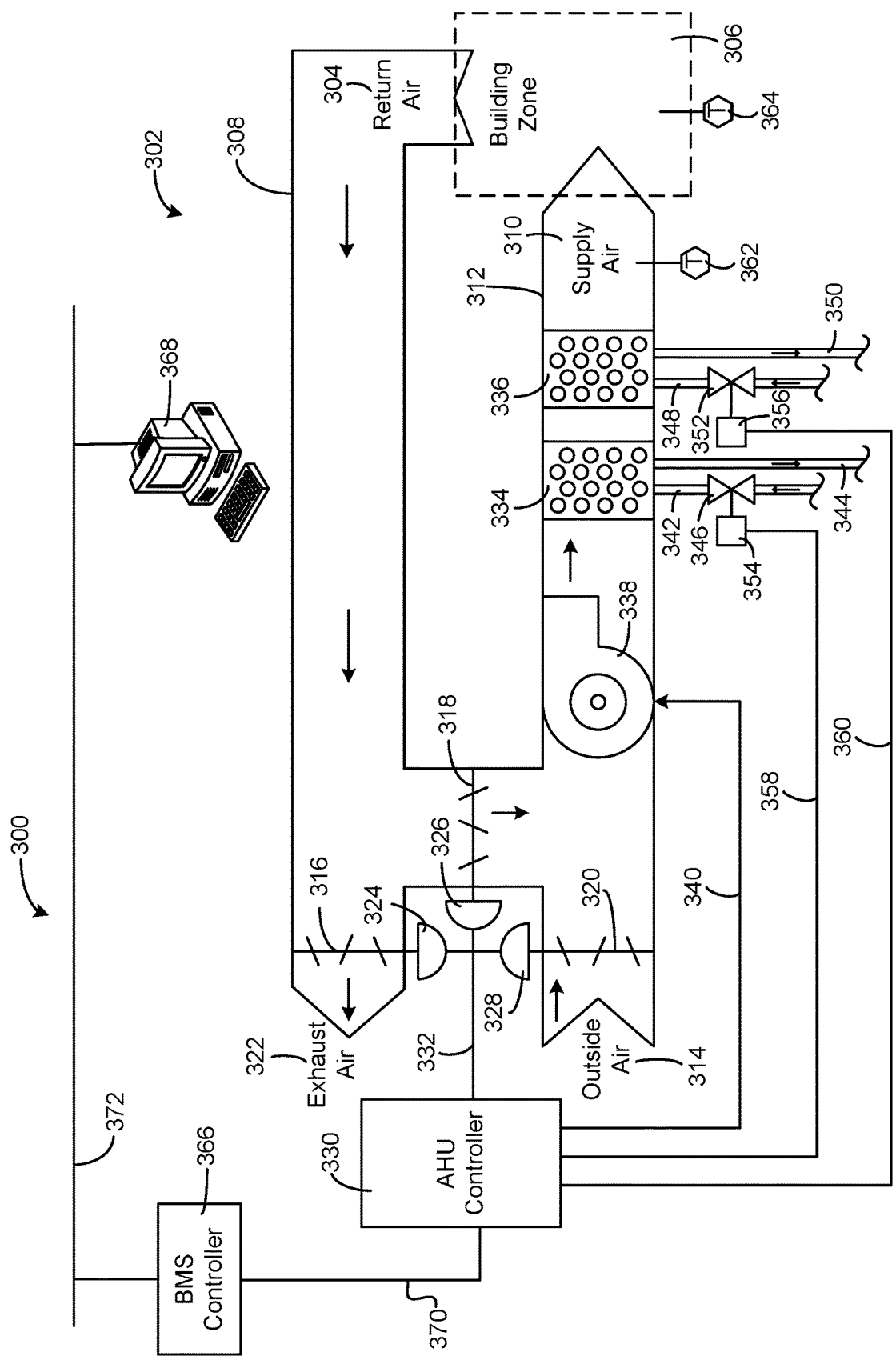
FIG. 3 is a block diagram of an airside system that may be used in conjunction with the building of FIG. 1, according to some embodiments.
Figure 4:
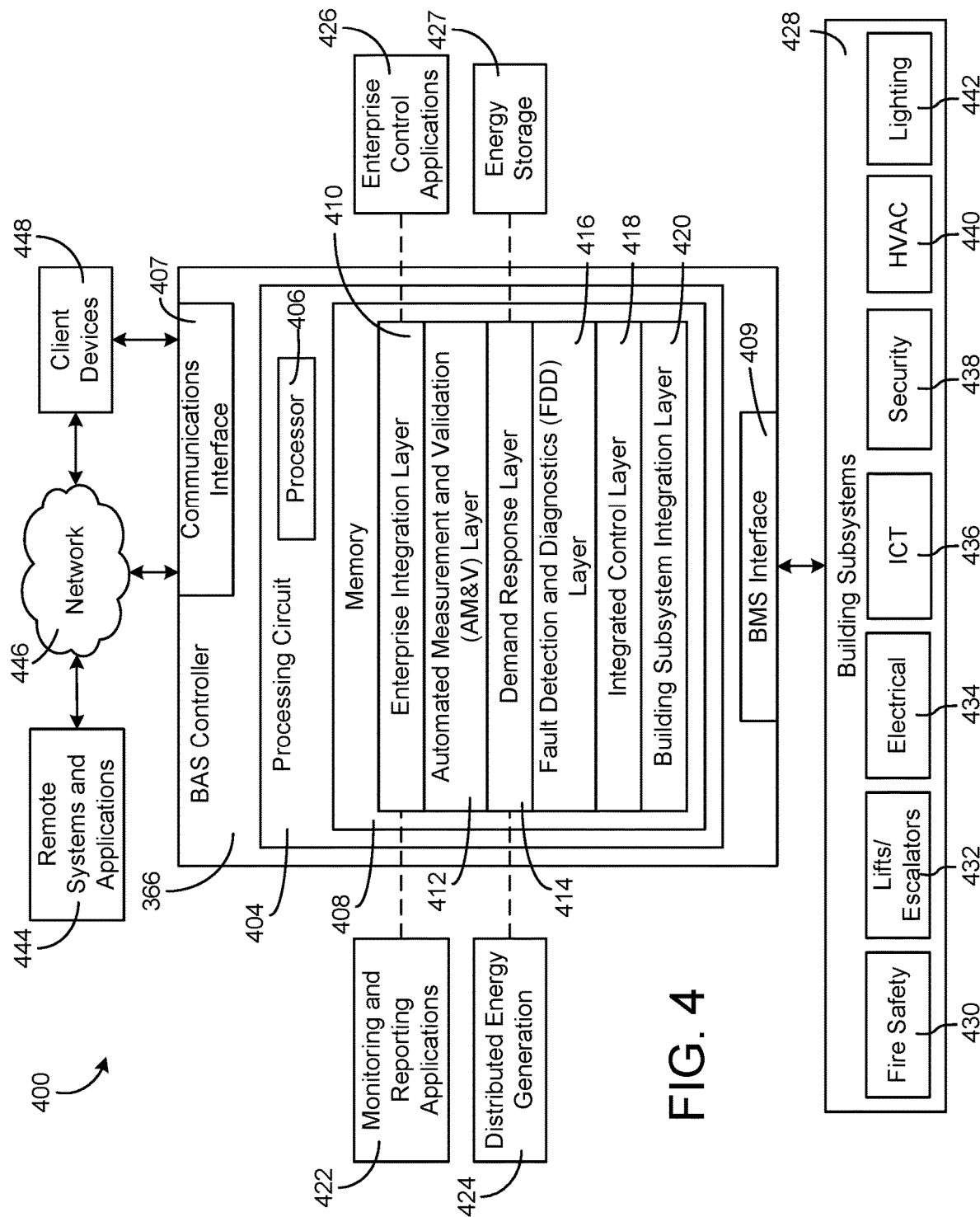
FIG. 4 is a block diagram of a building management system (BMS) which may be used to monitor and control the building of FIG. 1, according to some embodiments.

Referring now to FIGS. 1-4, several building management systems (BMS) and HVAC systems in which the systems and methods of the present disclosure may be implemented are shown, according to some embodiments. In brief overview, FIG. 1 shows a building 10 equipped with a HVAC system 100. FIG. 2 is a block diagram of a waterside system 200 which may be used to serve building 10. FIG. 3 is a block diagram of an airside system 300 which may be used to serve building 10. FIG. 4 is a block diagram of a BMS which may be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG.

1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 may be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 may include an Ethernet card and port for sending and receiving data via an Ethernet-based communications link or network. In another example, interfaces 407, 409 may include a Wi-Fi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407, 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 may integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions may be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes may be examined by FDD layer 416 to expose when the system begins to degrade in performance and alert a user to repair the fault before it becomes more severe.

Estimating Flow Rate Values of a Valve

Figure 5:
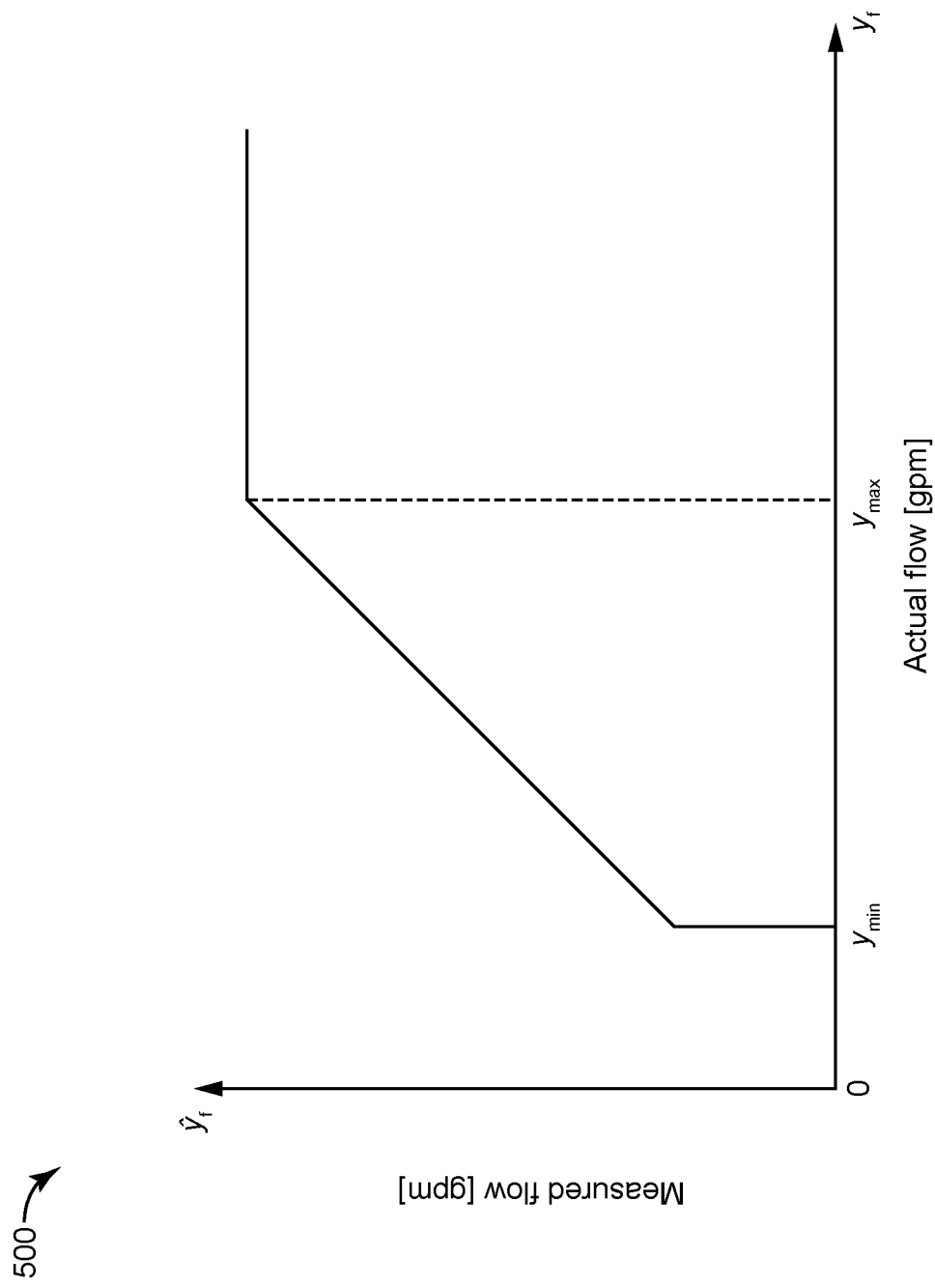
FIG. 5 is a graph illustrating a conventional working range corresponding to a flow rate sensor that may be used in conjunction with the building of FIG. 1, according to some embodiments.

Referring to FIG. 5, one non-limiting example of a flow rate sensor working range is provided. As shown by the graph 500, flow rate values below the minimum flow rate threshold ($y_{min}$) read as 0. Conversely, flow rate values above the maximum rating of the flow sensor ($y_{max}$) may read as saturations at the maximum flow. In some situations, the behavior of the flow rate sensors outside of the working range may affect the ability of a flow controller to reach desired flow setpoints.

Figure 6:
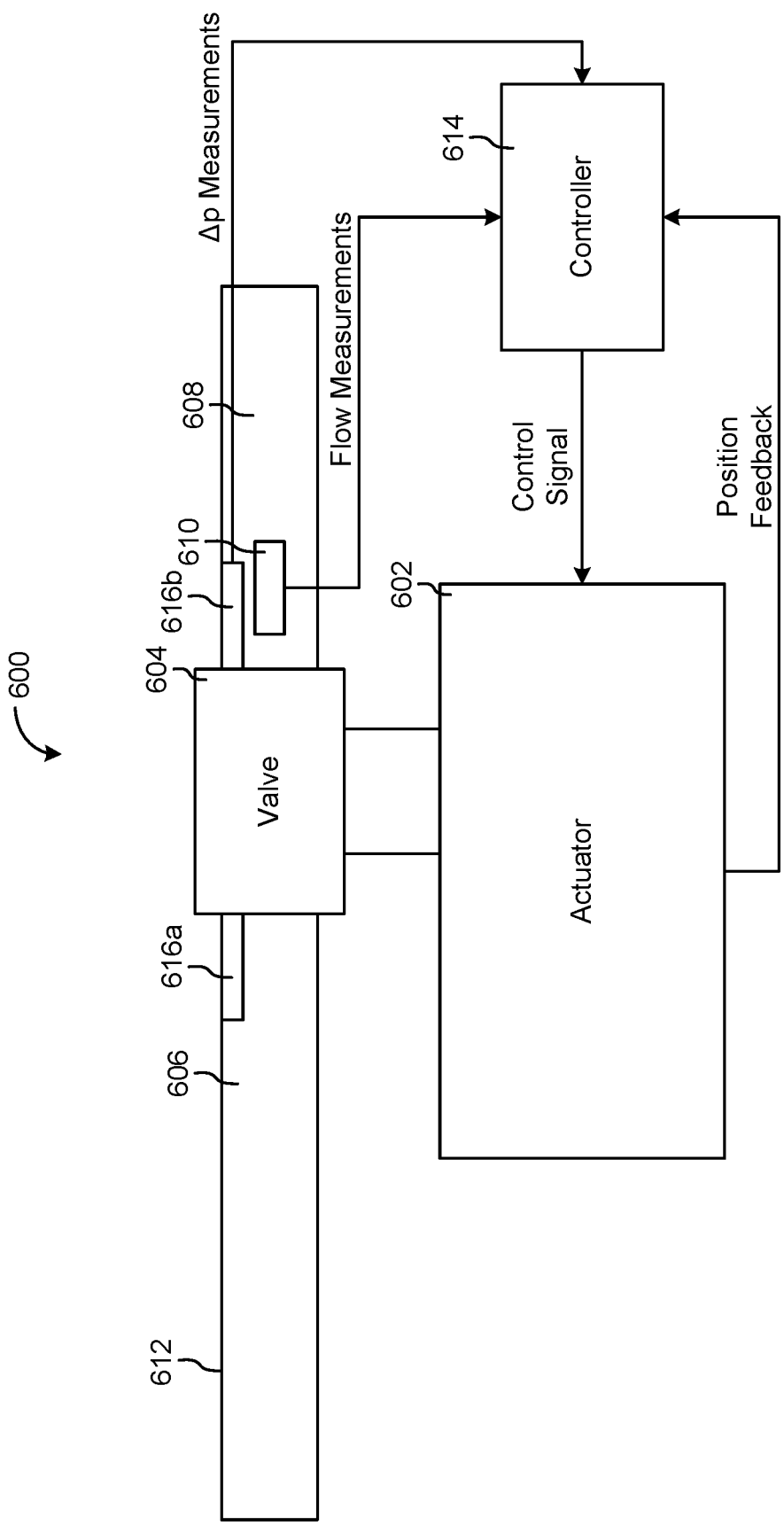
FIG. 6 is a block diagram of an actuator, valve device, and controller that may be implemented in the HVAC system of FIG. 1, according to some embodiments.

Referring now to FIG. 6, a block diagram of a system 600 including an actuator 602, a valve device 604, and a controller 614 is shown, according to some embodiments. System 600 may be implemented in HVAC system 100, waterside system 200, airside system 300, or BMS 400, as described with reference to FIGS. 1-4. As shown, actuator 602 may be coupled to valve device 504. For example, actuator 602 may be a damper actuator, a fan actuator, a pump actuator, or any other type of actuator that may be used in an HVAC system or BMS. In various embodiments, actuator 602 may be a linear actuator (e.g., a linear proportional actuator), a non-linear actuator, a spring return actuator, or a non-spring return actuator.

Valve device 604 may be any type of control device configured to control an environmental parameter in an HVAC system, including a 2-way or 3-way two position electric motorized valve, a ball isolation value, a floating point control valve, an adjustable flow control device, or a modulating control valve. In some embodiments, valve device 604 may regulate the flow of fluid through a conduit, pipe, or tube (e.g., conduit 612) in a waterside system (e.g., waterside system 200, shown in FIG. 2). Conduit 512 may include upstream conduit section 606 and downstream conduit section 608. In other embodiments, valve 604 may regulate the flow of air through a duct in an airside system (e.g., airside system 300, shown in FIG. 3).

In some embodiments, actuator 602 and valve device 604 may be located within a common integrated device chassis or housing. In short, actuator 602 and valve device 604 may not be packaged as separate devices, but as a single device. However, in some embodiments, actuator 602 and valve device 604 may be packaged as separate devices that may be communicably coupled via a wire or a wireless connection.

Still referring to FIG. 6, flow sensor 610 is shown to be disposed within downstream conduit section 608. Flow sensor 610 may be configured to measure the flow rate or velocity of fluid passing through conduit 612, and more specifically, the flow rate of fluid exiting valve 604. Flow sensor 610 may be any type of device (e.g., ultrasonic detector, paddle-wheel sensor, pitot tube, drag-force flowmeter) configured to measure the flow rate or velocity using any applicable flow sensing method.

In some embodiments, flow sensor 610 may be a heated thermistor flow sensor that operates according to the principles of King's Law. According to King's Law, the heat transfer from a heated object exposed to a moving fluid is a function of the velocity of the fluid. King's Law devices have several features, including very high sensitivity at low flow rates and measurement of the fluid temperature (which may be useful for fault detection and control purposes), although they have decreased sensitivity at high flow rates.

In other embodiments, flow sensor 610 may be a vortex-shedding flowmeter configured to determine the fluid flow rate by calculating the Strouhal number. The Strouhal number is a dimensionless value useful for characterizing oscillating flow dynamics. A vortex-shedding flowmeter measures the flow rate via acoustic detection of cortices in fluid caused when the fluid flows past a cylindrically-shaped obstruction. The vibrating frequency of the vortex shedding is correlated to the flow velocity. Vortex-shedding flowmeters generally have good sensitivity over a range of flow rates, although they require a minimum flow rate in order to be operational.

In some embodiments, flow sensor 610 may be communicably coupled to actuator 602. For example, flow sensor 610 may be coupled via wired or wireless connection to a controller 614 of system 600 for the purpose of transmission of flow rate measurements. In various embodiments, flow rate data signals may be used by the controller of device 600 to determine control operations for actuator 602 and/or valve 604. In further embodiments, flow sensor 610 may be disposed within valve 604 to measure the rate of fluid flow before the fluid exits valve 604. When flow sensor 610 is located within valve 604, flow sensor 610 may additionally function as a fault detection mechanism for system 600. For example, when debris becomes lodged in actuator 602 or valve 604, flow through valve 604 may be significantly reduced. This reduction in flow may occur because the components of actuator 602 cannot freely operate valve 604, or because the debris within valve 604 obstructs flow through conduit 612.

Still referring to FIG. 6, pressure sensors 616a, 616b are shown to be disposed within conduit 612. Pressure sensors 616a, 616b may be configured to measure pressure within conduit 612. In some embodiments, a differential pressure ($\Delta p$) may be calculated using a pressure measurement from pressure sensor 616a and a separate pressure measurement from pressure sensor 616b. As one example, pressure sensor 616a may be disposed within upstream conduit section 606 and may be configured to measure a pressure upstream of valve 604. Conversely, pressure sensor 616b may be disposed within downstream conduit section 608 and may be configured to measure a pressure downstream of valve 604.

In some embodiments, pressure sensors 616a, 616b may be communicably coupled to actuator 602. For example, pressure sensors 616a, 616b may be coupled via wired or wireless connection to a controller 614 of system 600 for the purpose of transmission of pressure measurements. In various embodiments, $\Delta p$ data signals may be used by controller 614 to determine control operations for actuator 602 and/or valve 604.

As shown by FIG. 6, controller 614 may receive input signals such as flow measurements from flow sensor 610 and $\Delta p$ measurements from the pressure sensors 616a, 616b. Additionally, controller 614 may receive position feedback signals from actuator 602. The position feedback signals may be used by controller 614 to determine control operations for actuator 602 and/or valve 604. Controller 614 may provide a control signal to actuator 602. The control signal may be used to operate actuator 602. The control signal may be determined by the controller using various methods. In some situations, the control signal may be determined based on a combination of inputs (e.g., flow measurements, position feedback, $\Delta p$ measurements). In some situations, the control signal may be at least partially determined by known properties and/or experimentally determined values associated with valve 604.

Figure 7:
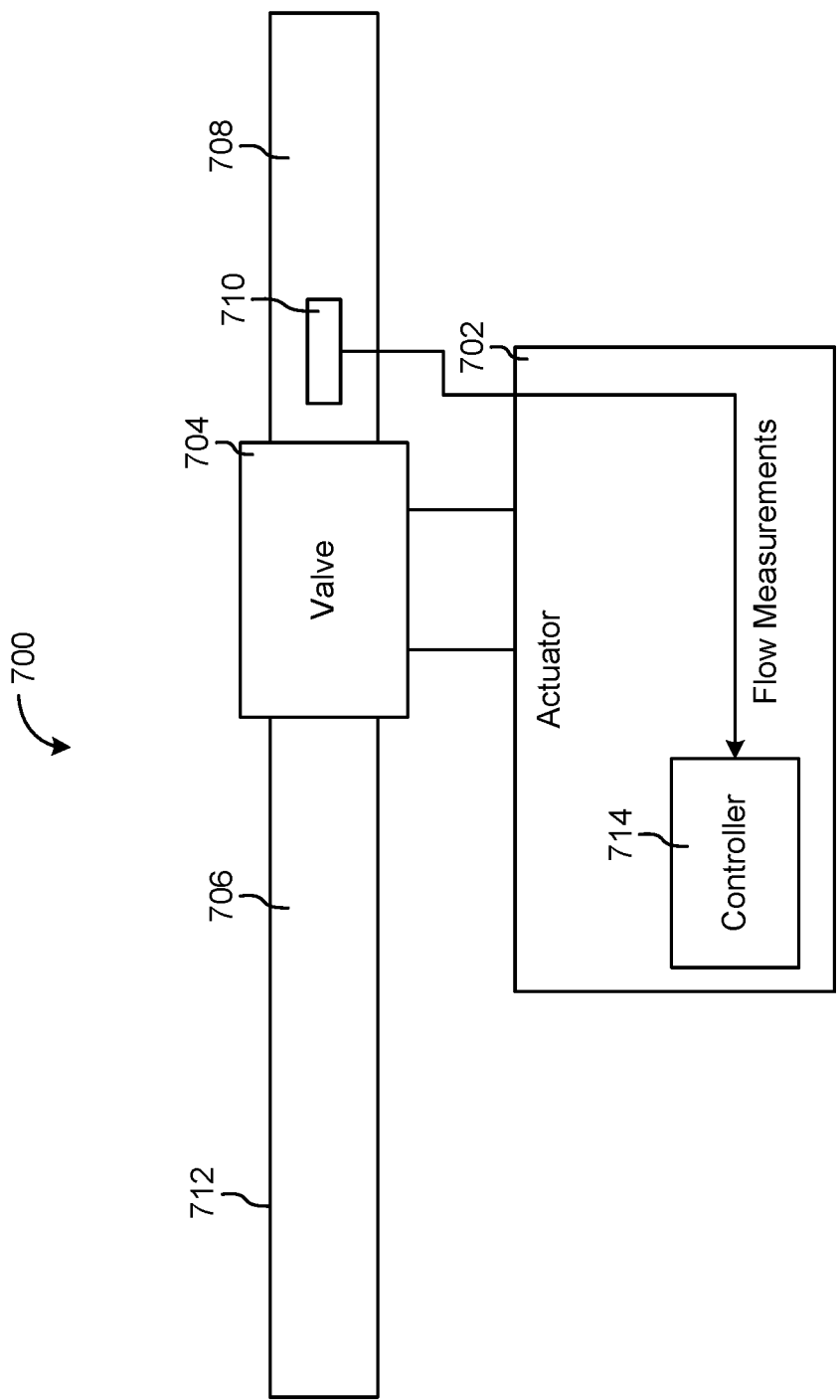
FIG. 7 is a block diagram of an integrated smart actuator and valve device that may be implemented in the HVAC system of FIG. 1, according to some embodiments.

Referring now to FIG. 7, a block diagram of another system 700 is shown, according to some embodiments. System 700 may be used in HVAC system 100, waterside system 200, airside system 300, or BMS 400, as described with reference to FIGS. 1-4. System 700 may represent an alternate configuration of system 600. For example, controller 714 may be contained within actuator 702. Specifically, controller 714 and actuator 702 may be packaged and installed as a single component. As shown, controller 714 receives flow measurements from flow sensor 710.

System 700 may be such that valve device 704 may regulate the flow of fluid through a conduit, pipe, or tube (e.g., conduit 712) in a waterside system (e.g., waterside system 200, shown in FIG. 2). Conduit 712 may include upstream conduit section 706 and downstream conduit section 708. Flow sensor 710 may be disposed within downstream conduit section 708. Valve 704 may function similarly to valve 604, as previously described.

Examples of "smart actuators" including a controller which can be used in system 600 and/or system 700 are described in detail in U.S. Pat. No. 9,746,199 issued on Aug. 29, 2017 and entitled "Integrated Smart Actuator and Valve Device." The entire disclosure of this patent is incorporated by reference herein.

Figure 8:
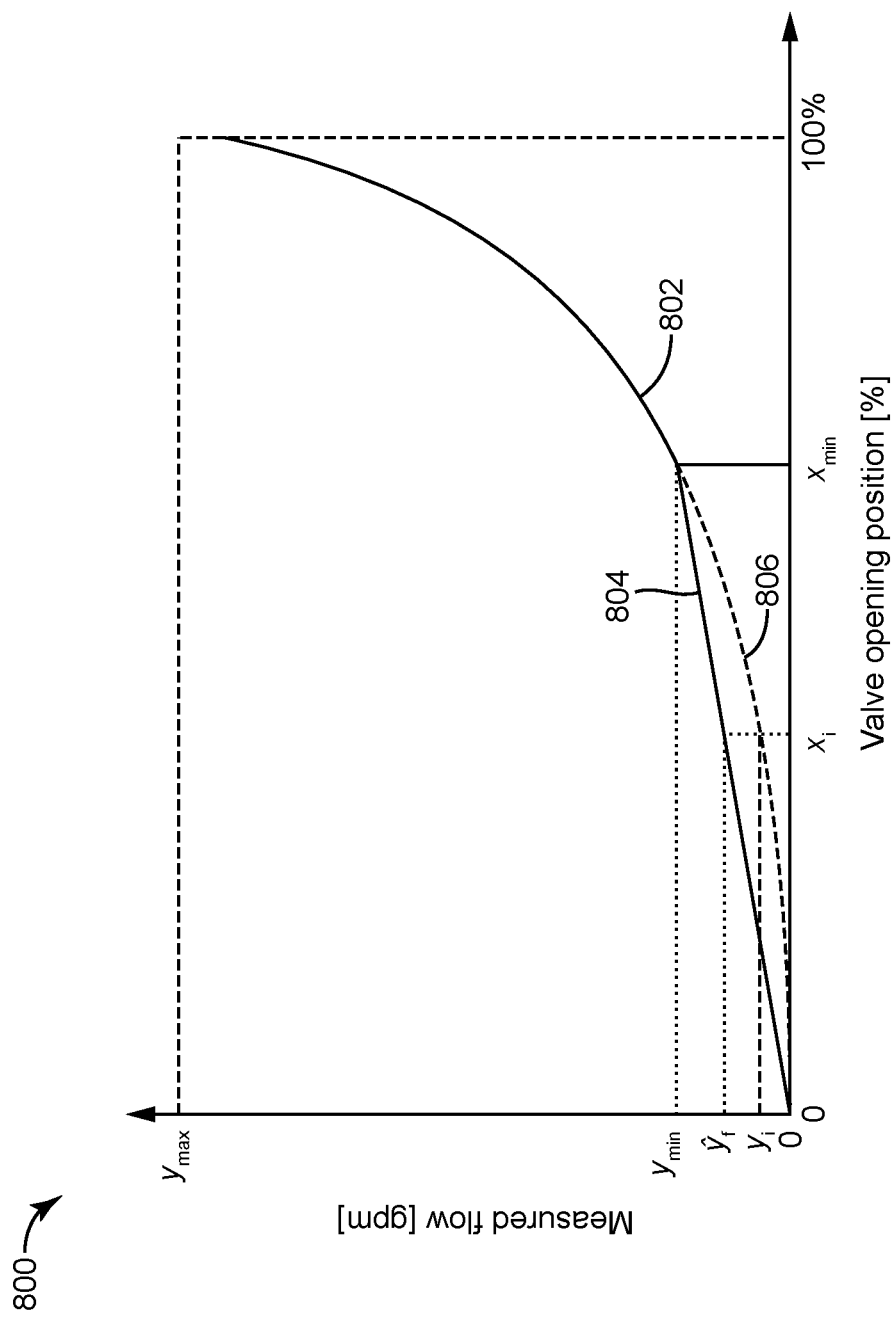
FIG. 8 is a graph illustrating an example profile of the flow rate measured by a flow rate sensor for a given opening of a valve, according to some embodiments.

Referring to FIG. 8, graph 800 illustrates an example of the flow rate measured by a flow rate sensor for a given opening of a valve. Line 802 represents the flow rate values that the flow rate sensor may typically output. As shown, the flow measured above $y_{min}$ behaves exponentially with respect to the valve opening and flows below $y_{min}$ are read as 0 by the flow rate sensor. In contrast, line 806 shows what the flow rate values would be if the flow rate sensor could read continuously below $y_{min}$.

Still referring to FIG. 8, if the flow rate sensor were able to read any flow greater than zero, it would read a flow of $y_i$ gpm when the valve opening is $x_i$ %; instead, it reads a zero gpm value since the valve opening $x_i$ is below the $x_{min}$ value that produces a readable flow. This nonlinearity may be compensated by estimating the value of $y_i$ for a given $x_i$. According to one embodiment of the present disclosure, a line may be drawn between the origin and the point ($x_{min}$, $y_{min}$) (e.g., line 804). The line may then be used to calculate an estimated flow $\hat{y}_f$ (i.e. a corrected flow) for the current valve opening.

In other embodiments, a function may be determined based on the origin and the point ($x_{min}$, $y_{min}$). The function may be, for example, quadratic, exponential, cubic, or an $n^{th}$ order polynomial. The function may be based on experimental data and analysis.

Figure 9:
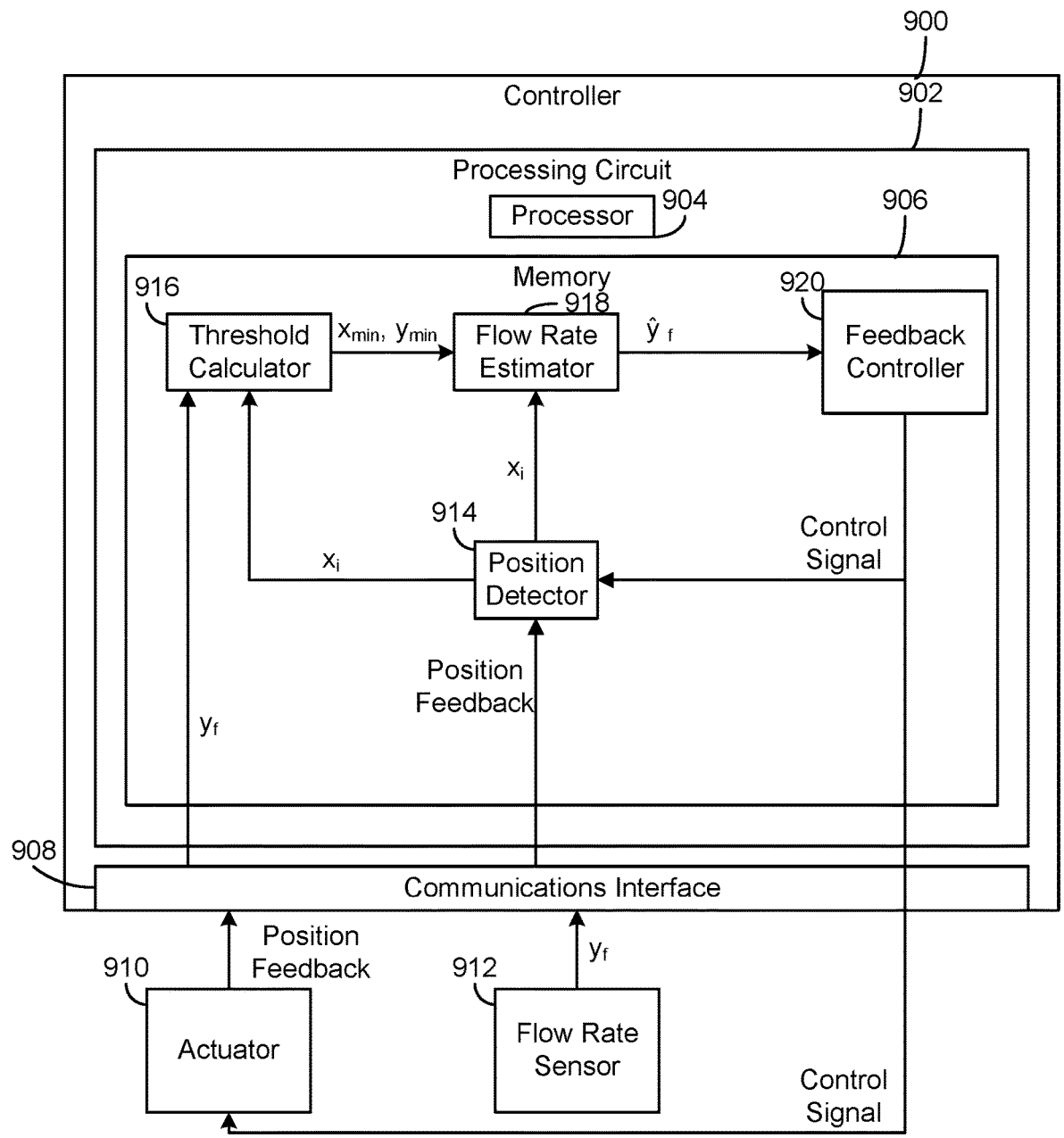
FIG. 9 is a block diagram of a control system with position and flow rate inputs to a controller that may be implemented in the HVAC system of FIG. 1, according to some embodiments.

Referring now to FIG. 9, a block diagram illustrating controller 900 in detail is shown, according to one embodiment. Controller 900 can be used as controller 614 in system 600 and/or controller 714 in system 700. Controller 900 is shown to include a communications interface 908 and a processing circuit 902. Communications interface 908 may include wired or wireless interfaces (e.g., jacks, antennas, transmitters, receivers, transceivers, wire terminals, etc.) for conducting data communications with various systems, devices, or networks. For example, communications interface 908 may include an Ethernet card and port for sending and receiving data via an Ethernet-based communications network and/or a WiFi transceiver for communicating via a wireless communications network. Communications interface 908 may be configured to communicate via local area networks or wide area networks (e.g., the Internet, a building WAN, etc.) and may use a variety of communications protocols (e.g., BACnet, IP, LON, etc.).

Communications interface 908 may be a network interface configured to facilitate electronic data communications between controller 900 and various external systems or devices (e.g., actuator 910, flow rate sensor 912, etc.). Controller 900 may receive position feedback from actuator 910 and measured flow rates ($y_f$) from flow rate sensor 912. Controller 900 may be configured to output a corrected flow rate ($\hat{y}_f$) to feedback controller 920, as well as receive a control signal from feedback controller 920.

Processing circuit 902 is shown to include a processor 904 and memory 906. Processor 904 may be a general purpose or specific purpose processor, an application specific integrated circuit (ASIC), one or more field programmable gate arrays (FPGAs), a group of processing components, or other suitable processing components. Processor 904 may be configured to execute computer code or instructions stored in memory 906 or received from other computer readable media (e.g., CDROM, network storage, a remote server, etc.).

Memory 906 may include one or more devices (e.g., memory units, memory devices, storage devices, etc.) for storing data and/or computer code for completing and/or facilitating the various processes described in the present disclosure. Memory 906 may include random access memory (RAM), read-only memory (ROM), hard drive storage, temporary storage, non-volatile memory, flash memory, optical memory, or any other suitable memory for storing software objects and/or computer instructions. Memory 906 may include database components, object code components, script components, or any other type of information structure for supporting the various activities and information structures described in the present disclosure. Memory 906 may be communicably connected to processor 904 via processing circuit 902 and may include computer code for executing (e.g., by processor 904) one or more processes described herein.

Still referring to FIG. 9, controller 900 is shown to include a threshold calculator 916. Threshold calculator 916 is shown receiving the measured flow rate ($y_f$) from flow rate sensor 912. Additionally, threshold calculator 916 may receive a valve opening position ($x_i$) from a position detector 914. Threshold calculator 916 may calculate a minimum valve position threshold ($x_{min}$) and/or a minimum flow rate threshold ($y_{min}$) for a given valve, in accordance with the methods described herein. $x_{min}$ and $y_{min}$ may be provided as an input to a flow rate estimator 918.

Flow rate estimator 918 is shown receiving $x_{min}$ and $y_{min}$ from threshold calculator 916, as well as the valve opening position ($x_i$) from position detector 914. Flow rate estimator 918 may be configured to use the inputs $x_{min}$, $y_{min}$, and $x_i$ to calculate a corrected flow rate ($\hat{y}_f$), in accordance with the methods described by performing any of steps 1110, 1212, 1912 described in detail with reference to FIGS. 11, 12, and 19. $\hat{y}_f$ may be provided as an input to feedback controller 920.

Feedback controller 920 is shown receiving $\hat{y}_f$ from flow rate estimator 918. Based on $\hat{y}_f$, feedback controller 920 may determine a control signal (e.g., an associated output voltage) that may be provided to actuator 910 to further open or close the associated valve opening. The control signal may be provided as an input to actuator 910, and/or to position detector 914.

Providing the control signal from feedback controller 920 to position detector 914 may provide a distinct benefit. As will be discussed below in detail, the methods described herein use the valve opening position ($x_i$) in the calculations to determine $\hat{y}_f$. The valve opening position ($x_i$) may be provided by the position of the valve actuator (e.g., actuator 910). However, there may be valves that are unable to expose the actuator position to position detector 914. In these situations, it may be beneficial to use the control signal directly from feedback controller 920 as a proxy for $x_i$. Since the valve should eventually open or close according to the value of the control signal, as provided by feedback controller 920, it may be beneficial to use the control signal when the actuator position cannot be exposed, or when it is otherwise difficult to use.

Still referring to FIG. 9, position detector 914 is shown receiving the control signal from feedback controller 920, and the position feedback from actuator 910. In some embodiments, position detector 914 may only receive one of the position feedback or the control signal, for reasons discussed in the preceding paragraphs. In other embodiments, position detector 914 may receive both the position feedback and the control signal as inputs. Position detector 914 is configured to calculate a valve opening position ($x_i$) using position feedback and/or the control signal. Position detector 914 may provide $x_i$ to both threshold calculator 916 and flow rate estimator 918.

Figure 10:
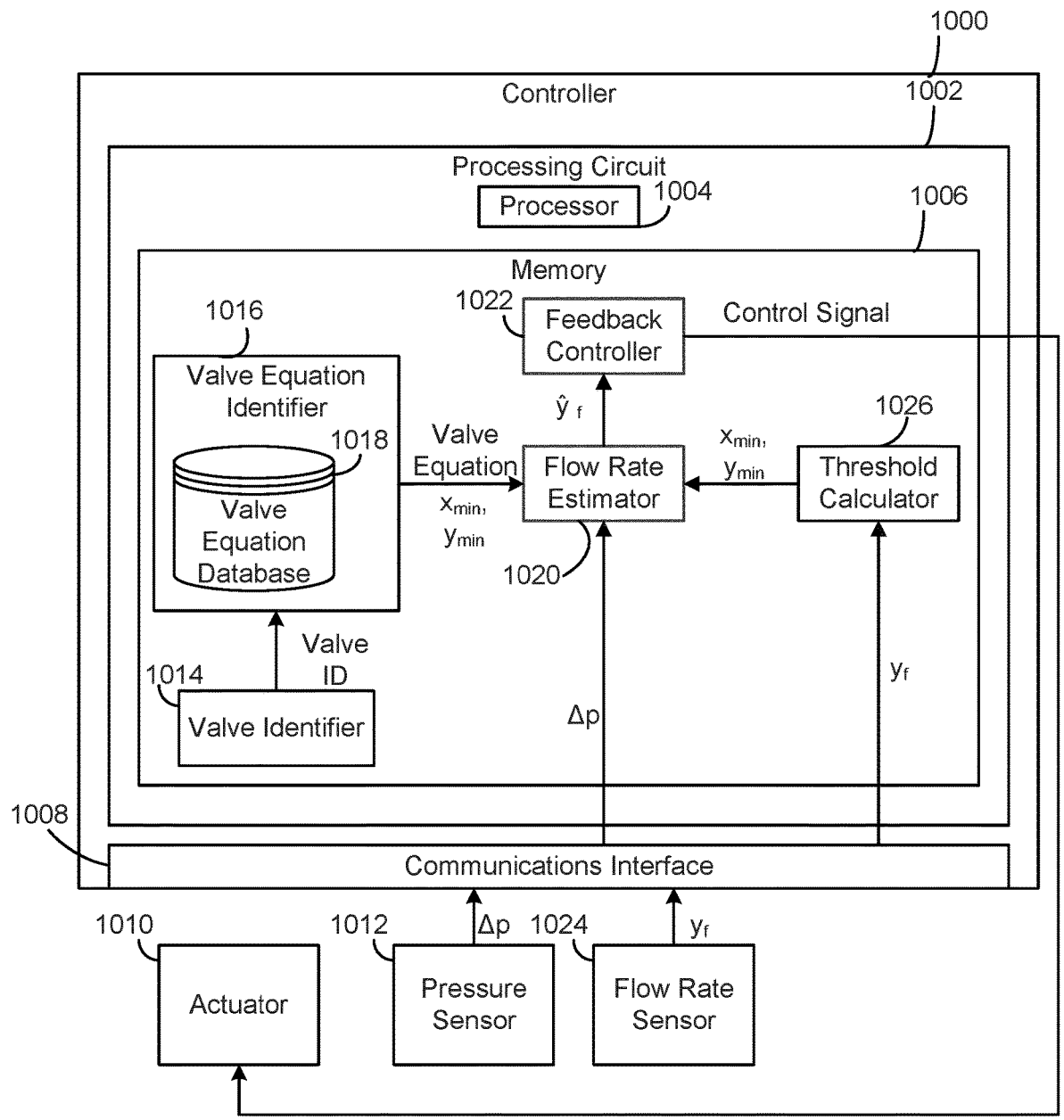
FIG. 10 is a block diagram of another control system with a pressure differential values and flow rate inputs to a controller that may be implemented in the HVAC system of FIG. 1, according to some embodiments.

Referring now to FIG. 10, a block diagram illustrating controller 1000 in detail is shown, according to one embodiment. Controller 1000 is shown to include a communications interface 1008, processing circuit 1002, processor 1004, and memory 1006. In some embodiments, controller 1000 may be similar to controller 900, as described above. In some embodiments, communications interface 1008 may be similar to communications interface 908, as described above. In some embodiments, processing circuit 1002 may be similar to processing circuit 902, as described above. In some embodiments, processor 1004 may be similar to processor 904. In some embodiments, memory 1006 may be similar to memory 906.

Communications interface 1008 may be a network interface configured to facilitate electronic data communications between controller 1000 and various external systems or devices (e.g., actuator 1010, flow rate sensor 1024, pressure sensor 1012, etc.). Controller 1000 may receive measured flow rates ($y_f$) from flow rate sensor 1024 and change in pressure ($\Delta p$) from pressure sensor 1012. Controller 1000 may be configured to output a corrected flow rate ($\hat{y}_f$) to feedback controller 1022.

Pressure sensor 1012 may be configured to measure a differential pressure ($\Delta p$) across the valve. This may be done via a plurality of sensors (e.g., as described by FIG. 6). By using Δp as an input, the corrected flow rate ($\hat{y}_f$) may be calculated. Advantageously, this system and associated methods do not rely on determining a valve opening position ($x_i$); in some situations, determining a valve opening position may not be possible or may be difficult. By using Δp as an input, the valve opening position does not need to be determined.

Still referring to FIG. 10, controller 1000 is shown to include a threshold calculator 1026. Threshold calculator 1026 is shown receiving the measured flow rate ($y_f$) from flow rate sensor 1024. Threshold calculator 1026 may calculate a minimum valve position threshold ($x_{min}$) and/or a minimum flow rate threshold ($y_{min}$) for a given valve, in accordance with the methods described herein. $x_{min}$ and $y_{min}$ may be provided as an input to a flow rate estimator 1020.

In some embodiments, the values of $x_{min}$ and $y_{min}$ may be known based on valve identification information. Accordingly, threshold calculator 1026 may not be used to calculate $x_{min}$ and $y_{min}$. In these situations, valve equation identifier 1016 may provide $x_{min}$ and $y_{min}$ to flow rate estimator 1020.

Controller 1000 is shown to include a valve identifier 1014, which outputs a valve ID to valve equation identifier 1016. The valve identifier 1014 may read the valve ID from memory 1006. Alternatively, valve identifier 1014 may utilize user input via communications interface 1008 to determine the proper valve ID.

Still referring to FIG. 10, controller 1000 is shown to include valve equation identifier 1016. Commonly, different valve types have different corresponding valve equations that may be used in the calculation of various system variables. As shown, the valve equations may be stored in a valve equation database 1018. Alternatively, the valve equations may be stored in a look-up table. The valve equation database 1018 or look-up table may be stored in the controller memory 1006, or may be stored externally and accessed by controller 1000. Using the valve ID input, valve equation identifier 1016 determines and outputs a valve equation. As discussed above, valve equation identifier 1016 may also output known values for $x_{min}$ and $y_{min}$. The valve equation and $x_{min}$ and $y_{min}$ may be provided as inputs to flow rate estimator 1020.

Flow rate estimator 1020 is shown receiving $x_{min}$ and $y_{min}$ from either threshold calculator 1026 or valve equation identifier 1016. Additionally, flow rate estimator 1020 is shown receiving a valve equation from valve equation identifier 1016, and Δp from pressure sensor 1012. Flow rate estimator 1020 is configured to use the inputs $x_{min}$, $y_{min}$, the valve equation, and Δp to calculate a corrected flow rate ($\hat{y}_f$), in accordance with the methods described by performing any of steps 1110, 1212, 1912 described in detail with reference to FIGS. 11, 12, and 19. $\hat{y}_f$ may be provided as an input to feedback controller 1022.

Feedback controller 1022 is shown receiving $\hat{y}_f$ from flow rate estimator 1020. Based on $\hat{y}_f$, feedback controller 920 may determine an associated output voltage that may be provided to actuator 1010 to further open or close the associated valve opening.

In some embodiments, actuators 1010, 910, 602 may function similarly. In some embodiments, actuators 1010, 910, 702 may function similarly. In some embodiments, controllers 614, 900, 1000, 714 may function similarly. In some embodiments, flow sensors 710, 912, 610, 1024 may function similarly. In some embodiments, pressure sensor 1012 may incorporate the functionality of multiple pressure sensors (e.g., pressure sensors 616a, 616b).

Figure 11:
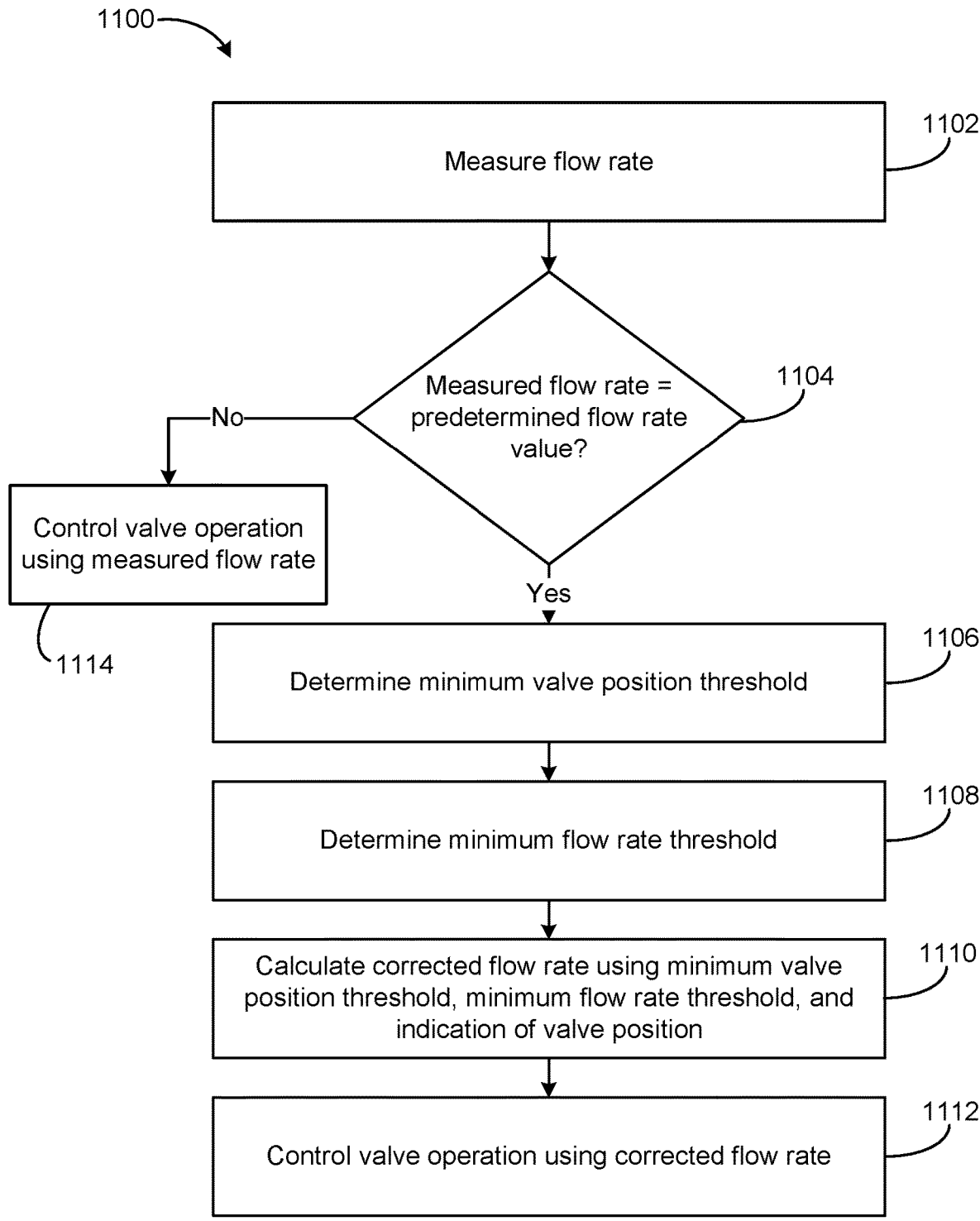
FIG. 11 is a flowchart of a flow rate correction method which may be performed by the controller of FIG. 9, according to some embodiments.

Referring now to FIG. 11, a flowchart of a flow rate correction method 1100 which may be performed by controller 900, is shown. Alternatively, the flow rate correction method 1100 may be performed by a different controller. Method 1100 is shown to include measuring a flow rate, $y_f$ (step 1102). The measuring of the flow rate may be done using any of the flow rate sensors previously described. The measured flow rate ($y_f$) is then compared to a predetermined flow rate value (step 1104). In some embodiments, the predetermined flow rate value is zero.

If the measured flow rate ($y_f$) is not equal to the predetermined flow rate value (i.e., the result of step 1104 is "no"), the measured flow rate ($y_f$) may then be used to control a valve operation (step 1114). This may occur, for example, when the measured flow rate ($y_f$) is non-zero. Alternatively, if the measured flow rate ($y_f$) is equal to the predetermined flow rate value (i.e., the result of step 1104 is "yes"), a minimum valve position threshold ($x_{min}$) may then be determined (step 1106). This may occur, for example, when the measured flow rate ($y_f$) is equal to zero. Additionally, a minimum flow rate threshold ($y_{min}$) that corresponds to $x_{min}$ may then be determined (step 1108).

Once $x_{min}$ and $y_{min}$ are determined, a corrected flow rate ($\hat{y}_f$) may be calculated using $x_{min}$, $y_{min}$, and a valve position indication (step 1110). In some embodiments, the valve position indication may be a change in pressure through the valve (Δp). In other embodiments, the valve position indication may be a valve opening position ($x_i$). In some embodiments, the valve position indication may correspond with a value other than Δp or $x_i$, depending on the desired implementation of method 1100. A valve operation may then be controlled using $\hat{y}_f$ (step 1112).

In some embodiments, the flow rate $y_f$ may be estimated as $\tilde{y}_f = g(x_i, x_{min}, y_{min})$. In some embodiments, a sensor output many utilize a function that outputs the measured flow rate if it is non-zero, or the estimated flow rate ($\tilde{y}_f$) otherwise. As one non-limiting example, the sensor may implement the function shown by Equation 1:

$$\hat{y}_f = \begin{cases} y_f, & \text{if } y_f \neq 0 \\ \tilde{y}_f, & \text{otherwise} \end{cases} \quad (1)$$

The interpolation function g( ) may have many different forms, and are not limited to the forms discussed herein.

In some embodiments, g( ) may be a polynomial function. Further, in some embodiments, the polynomial function may have the form $$g(x_i, x_{min}, y_{min}) = \frac{y_{min}}{x_{min}^n} x_i^n$$

where n may be the degree of the polynomial function. Accordingly, in some embodiments, the interpolation type may be selected by choosing a value of n. In one non-limiting embodiment, linear interpolation may be implemented using n=1. In another non-limiting embodiment, quadratic interpolation may be implemented using n=2. In some situations, it may be beneficial to use a cubic interpolation, where n=3.

In some embodiments, g( ) may be an exponential function. Further, in some embodiments, the polynomial function may have the form $g(x_i, x_{min}, y_{min}) = y_{min} b^{-x_{min}} b^{x_i}$ where b may be a chosen constant. In some situations, it may be beneficial to use the mathematical constant e=2.718. In some embodiments, a different value for b may be used.

In some embodiments, g( ) may include a spline interpolation (e.g., using a piecewise polynomial). In certain situations, it may be beneficial to use a spline interpolation in order to minimize any interpolation error.

In some embodiments, the corrected flow rate ($\hat{y}_f$) may be calculated by performing a linear interpolation between the predetermined flow rate value and the minimum flow rate threshold $y_{min}$ as a function of the indication of valve opening position. The linear interpolation may include calculating a slope $$\frac{y_{min}}{x_{min}}$$

and multiplying the slope $$\frac{y_{min}}{x_{min}}$$

by an indication of valve position to calculate the corrected flow rate ($\hat{y}_f$).

As one non-limiting example, a function may be used. As one non-limiting example, if the measured flow rate is nonzero, the corrected flow rate may be equal to the measured flow rate. If the measured flow rate is zero, the corrected flow rate may be equal to the calculated slope multiplied by the indication of valve position.

Figure 12:
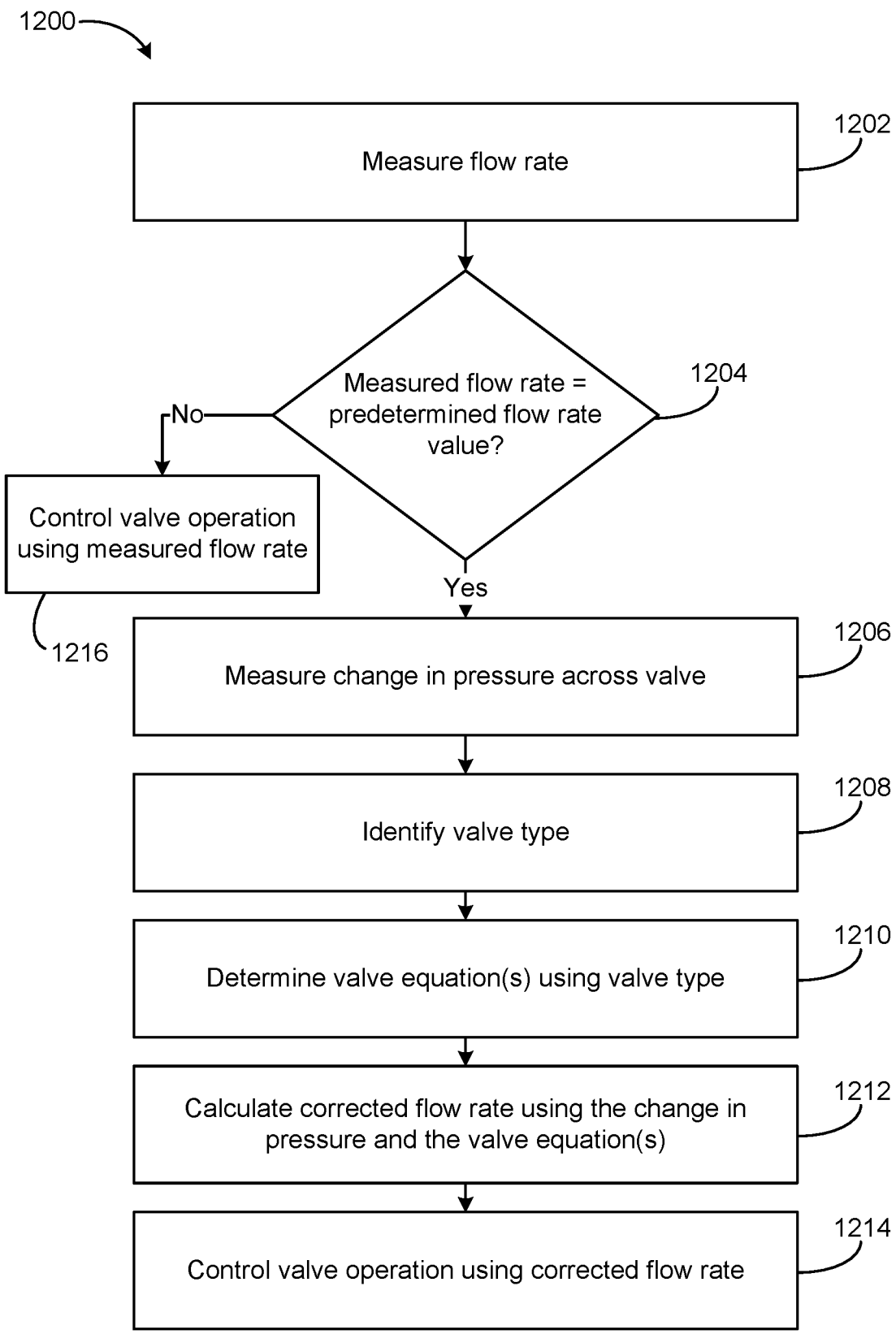
FIG. 12 is a flowchart of a flow rate correction method which may be performed by the controller of FIG. 10, according to some embodiments.

Referring to FIG. 12, a flowchart of another flow rate correction method 1200, which may be performed by controller 1000, is shown. Alternatively, the flow rate correction method 1200 may be performed by a different controller. Method 1200 is shown to include measuring a flow rate ($y_f$) (step 1202). The measuring of the flow rate may be done using any of the flow rate sensors, as described above. The measured flow rate ($y_f$) is then compared to a predetermined flow rate value (step 1204). In some embodiments, the predetermined flow rate value is zero.

If the measured flow rate ($y_f$) is not equal to the predetermined flow rate value (i.e., the result of step 1204 is "no"), the measured flow rate ($y_f$) may then be used to control a valve operation (step 1216). This may occur, for example, when the measured flow rate ($y_f$) is non-zero. Alternatively, if the measured flow rate ($y_f$) is equal to the predetermined flow rate value (i.e., the result of step 1204 is "yes"), a change in pressure (Δp) across the valve may be measured (step 1206). This may occur, for example, when the measured flow rate ($y_f$) is equal to zero. Δp may be measured using pressure sensors, as previously described.

Still referring to method 1200, a valve type may be identified (step 1208). The valve type may be stored in a memory corresponding to the controller. Using the valve type, corresponding valve equation(s) may be determined (step 1210). As discussed in relation to FIG. 10, the valve equations may be stored in a database or look-up table. The database or look-up table may be stored in the controller memory, or may be stored externally and accessed by the controller during step 1210. Using the change in pressure (Δp) and the valve equation(s), a corrected flow rate ($\hat{y}_f$) may be calculated (step 1212). A valve operation may then be controlled using $\hat{y}_f$ (step 1214).

In some embodiments, an installed flow characteristic for a valve may have the form $$g(x_i, x_{min}, y_{min}) = C_v \sqrt{\Delta P} \, C_{v,i}^{inst} \text{ with} \tag{2}$$

$$C_{v,i}^{inst} = \sqrt{\frac{1/N}{\frac{1}{N} - 1 + \frac{1}{k_i^2}}} \text{ and} \tag{3}$$

$$k_i = R^{x_i - 1} \tag{4}$$

With respect to Equations 2-4, ΔP may be the pressure drop across the valve, $C_v$ may be the valve coefficient, N may correspond to the valve authority, and R may be the valve rangeability. The terms $C_v$, N, and R may be constant values. In some embodiments, the constant values may be known from the valve and overall system design. In some embodiments, ΔP may be estimated from the flow measurements and the other known values and parameters as:

$$\sqrt{\Delta P} = \frac{y_{min}}{C_v C_{v,min}^{inst}} \tag{5}$$

and $$C_{v,min}^{inst} = \sqrt{\frac{1/N}{\frac{1}{N} - 1 + \frac{1}{k_{min}^2}}} \tag{6}$$

$$k_{min} = R^{x_{min} - 1} \tag{7}$$

In some embodiments, the minimum valve opening ($x_{min}$) that corresponds to the minimum measurable flow $y_{min}$ may not be known. Typically, $x_{min}$ depends on the valve size and the pressure drop (Δp) across the valve. Accordingly, the present disclosure includes methods for estimating $x_{min}$.

FIG. 8 shows that flow values are zero to the left of $x_{min}$ and non-zero to the right. This separation may help estimate the minimum valve position threshold ($\hat{x}_{min}$). When the sensor output is zero, $x_{min}$ may be the largest value that $x_i$ can achieve. Accordingly, in some embodiments, this value may be estimated as $\hat{x}_{min} = \max(\hat{x}_{min}, x_i)$.

In contrast, when the sensor output is non-zero, $x_{min}$ may be the smallest of all possible values of $x_i$. Accordingly, in some embodiments, this value may be estimated as $\hat{x}_{min} = \min(\hat{x}_{min}, x_i)$. In some embodiments, the value of $\hat{x}_{min}$ may be updated when the sensor output changes. In some situations, the value of $\hat{x}_{min}$ may be updated when the sensor output changes from zero to a non-zero value and/or from a non-zero value to zero.

In some embodiments, $\hat{x}_{min}$ may be initialized to 100. Pressure changes in the valve may change the value of $x_{min}$. As one non-limiting example, an increment in the pressure drop may reduce the actual value of $x_{min}$, and a pressure reduction may result in a larger $x_{min}$.

In some situations, noise in a flow sensor may affect the output of the flow controller, which may affect the estimated value $\hat{x}_{min}$. Accordingly, in some embodiments, filtering $\hat{x}_{min}$ may reduce the effect of noise.

In some embodiments, an exponentially weighted moving average (EWMA) may be used to filter the value of $\hat{x}_{min}$. In some situations, $\hat{x}_{min}$ may be filtered at each sample time. Many other filtering techniques may be implemented, and an EWMA is discussed herein as a non-limiting example.

Using an EWMA, a filtered estimated minimum valve position threshold, $\bar{x}_{min}$, may be obtained:

$$\bar{x}_{min} = \bar{x}_{min} + \alpha(\hat{x}_{min} - \bar{x}_{min}) \tag{8}$$

a weight, α, may be chosen as $$a = e^{-h/\tau_a} \quad (9)$$

where h may be the sample rate of the flow controller, and $\tau_a$ may be the time constant of the valve actuator. In some embodiments, the filtered value may be initialized as $\overline{x}_{min} = \hat{x}_{min}$.

In some embodiments, other methods may be used to estimate the minimum valve position threshold ($\hat{x}_{min}$). In another embodiment, the separation of zero and non-zero sensor output value may help estimate the minimum valve position threshold ($\hat{x}_{min}$). In the first case, $\hat{x}_{min}$ may be estimated when the sensor output is zero; this calculated value may be referred to as a first minimum valve position threshold ($\hat{x}_{min,left}$). In the second case, $\hat{x}_{min}$ may be estimated when the flow sensor output is non-zero; this calculated value may be referred to as a second minimum valve position threshold ($\hat{x}_{min,right}$).

Figure 13:
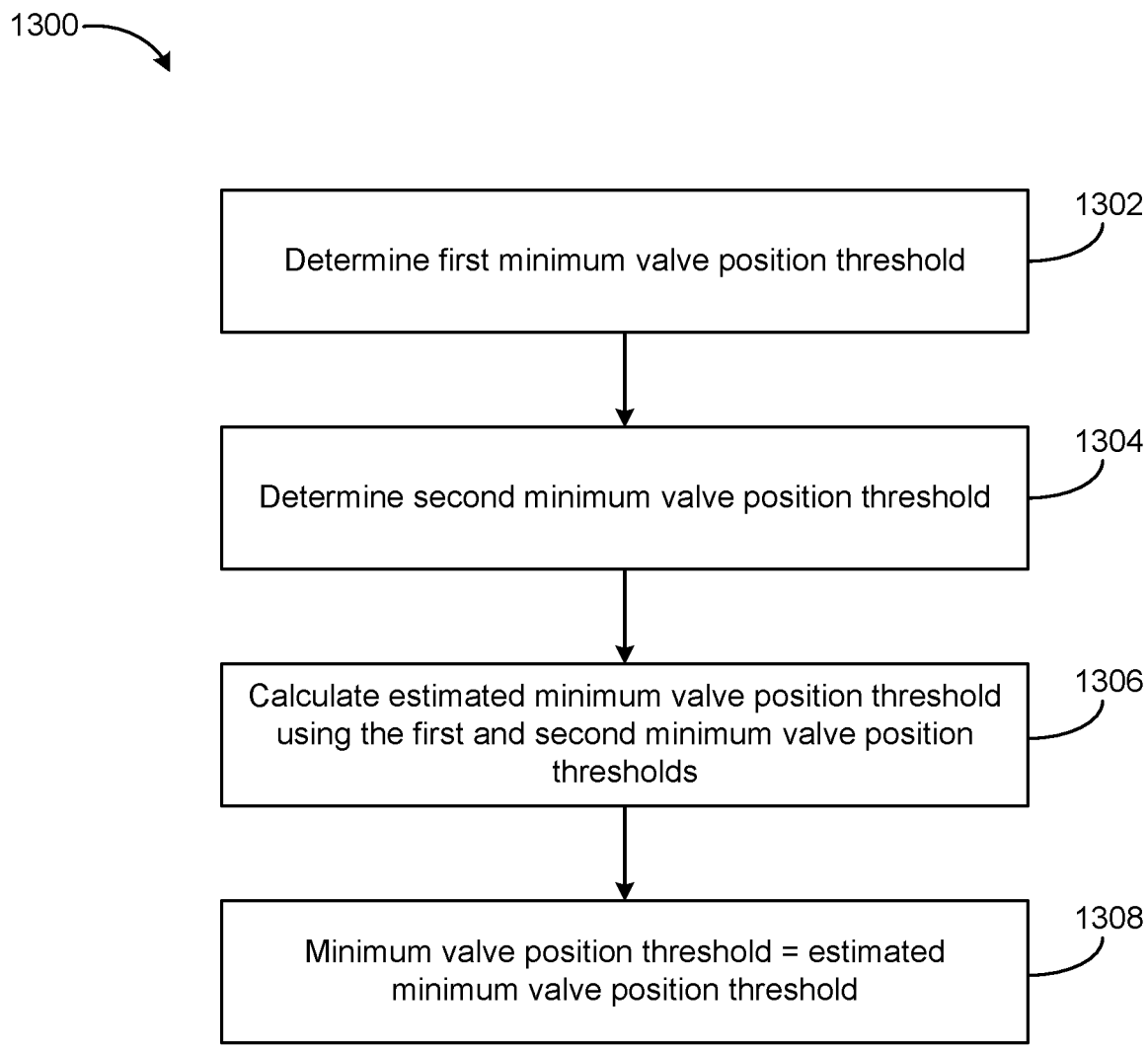
FIG. 13 is a flowchart of a process for estimating a minimum valve position threshold, according to some embodiments.

Referring now to FIG. 13, a flowchart of a method 1300 for estimating a minimum valve position threshold is shown, according to some embodiments. In some embodiments, method 1300 may be performed to accomplish step 1106 of FIG. 11 (i.e. determining a minimum valve position threshold ($x_{min}$)). Method 1300 is shown to include determining a first minimum valve position threshold ($\hat{x}_{min,left}$) (step 1302). A second minimum valve position threshold ($\hat{x}_{min,right}$) may be determined (step 1304). Once $\hat{x}_{min,left}$ and $\hat{x}_{min,right}$ are determined, the values may be used to calculate an estimated minimum valve position threshold ($\hat{x}_{min}$) (step 1306). For example, the minimum valve position threshold ($\hat{x}_{min}$) can be set equal to the average of $\hat{x}_{min,left}$ and $\hat{x}_{min,right}$. The minimum valve position threshold ($x_{min}$) may then be set as the estimated minimum valve position threshold ($\hat{x}_{min}$) (step 1308). In some embodiments, step 1306 may include averaging $\hat{x}_{min,left}$ and $\hat{x}_{min,right}$. In other embodiments, $\hat{x}_{min,left}$ and $\hat{x}_{min,right}$ may be used to compute $\hat{x}_{min}$ using different mathematical functions. Further, in some embodiments, $\hat{x}_{min,left}$ and $\hat{x}_{min,right}$ may be initialized at predetermined values.

Figure 14:
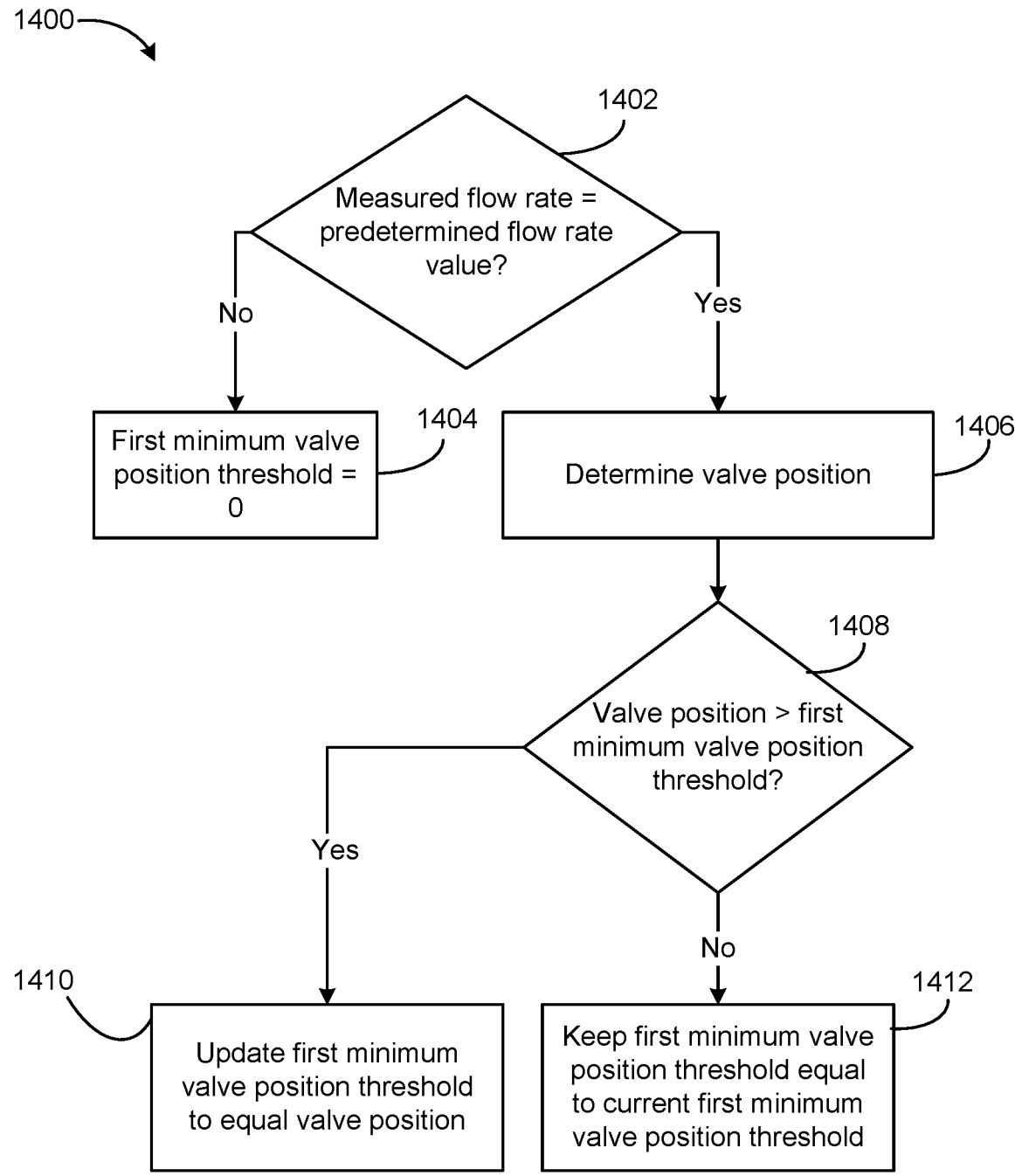
FIG. 14 is a flowchart of a process for determining a first minimum valve position threshold, according to some embodiments.

Referring now to FIG. 14, a flowchart of a method 1400 for determining a first minimum valve position threshold is shown. In some embodiments, method 1400 may be performed to accomplish step 1302 of FIG. 13 (i.e. determining a first minimum valve position threshold, $\hat{x}_{min,left}$). Method 1400 includes step 1402, where if the measured flow rate ($y_f$) is not equal to the predetermined flow rate value (i.e. the result of step 1402 is "no"), then the first minimum valve position threshold ($\hat{x}_{min,left}$) is set to zero (step 1404).

Alternatively, if the measured flow rate ($y_f$) is equal to the predetermined flow rate value (i.e. the result of step 1402 is "yes"), then the valve position ($x_i$) is determined (step 1406). If $x_i$ is greater than the first minimum valve position threshold (i.e. the result of step 1408 is "yes"), then the first minimum valve position threshold ($\hat{x}_{min,left}$) is updated to equal the valve position ($x_i$) (step 1410). Alternatively, if $x_i$ is less than the first minimum valve position threshold (i.e. the result of step 1408 is "no"), then the first minimum valve position threshold ($\hat{x}_{min,left}$) remains at its current value (step 1412).

Figure 15:
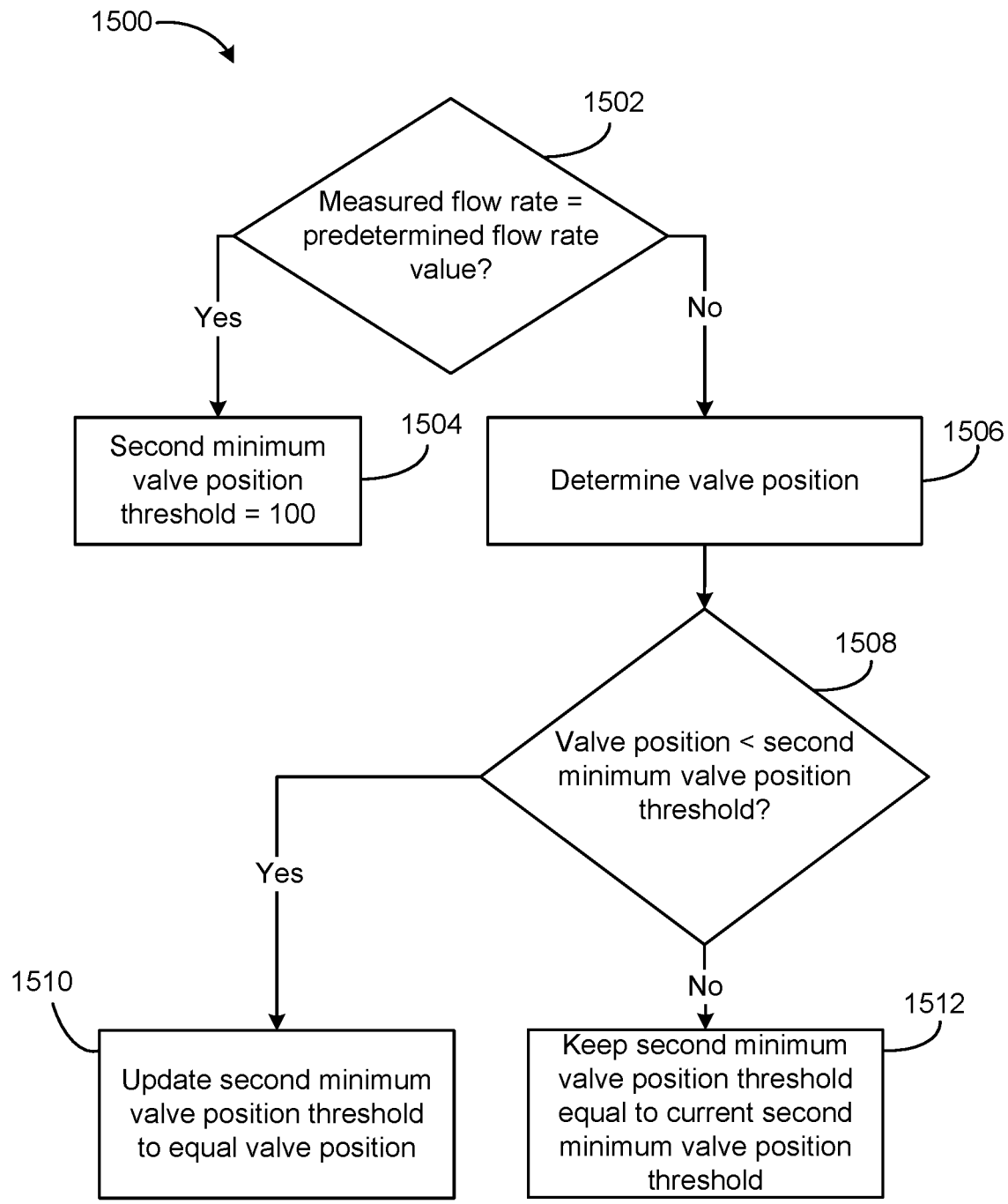
FIG. 15 is a flowchart of a process for determining a second minimum valve position threshold, according to some embodiments.

Referring now to FIG. 15, a flowchart of a method 1500 for determining a second minimum valve position threshold is shown. In some embodiments, method 1500 may be performed to accomplish step 1304 of FIG. 13 (i.e. determining a second minimum valve position threshold ($\hat{x}_{min,right}$)). Method 1500 includes step 1502, where if the measured flow rate ($y_f$) is equal to the predetermined flow rate value (i.e. the result of step 1502 is "yes"), then the second minimum valve position threshold ($\hat{x}_{min,right}$) is set to 100 or another large value (step 1504).

Alternatively, if the measured flow rate ($y_f$) is not equal to the predetermined flow rate value (i.e. the result of step 1502 is "no"), then the valve position ($x_i$) is determined (step 1506). If $x_i$ is less than the second minimum valve position threshold (i.e. the result of step 1508 is "yes"), then the second minimum valve position threshold ($\hat{x}_{min,right}$) is updated to equal the valve position, $x_i$ (step 1510). Alternatively, if $x_i$ is greater than the second minimum valve position threshold (i.e. the result of step 1508 is "no"), then the second minimum valve position threshold ($\hat{x}_{min,right}$) remains at its current value (step 1512).

With reference to methods 1300, 1400, and 1500 (as shown in FIGS. 13-15), for a constant pressure drop in a valve, $\hat{x}_{min,right}$ and $\hat{x}_{min,left}$ should be the same, thus, the estimated minimum valve position threshold ($\hat{x}_{min}$) may be approximately equal to the actual minimum valve opening ($x_{min}$). However, if the pressure drop increases or decreases in the valve, then $\hat{x}_{min,right}$ and $\hat{x}_{min,left}$ may be different.

For example, an increment in the pressure drop reduces the actual value of $x_{min}$. The reduction in $x_{min}$ causes $\hat{x}_{min,right}$ to decrease, but $\hat{x}_{min,left}$ remains constant; this happens due to the setting of $\hat{x}_{min,left}$ to the maximum of $x_i$ and $\hat{x}_{min,left}$. Conversely, a reduction in the pressure drop results in a larger $x_{min}$, which increases the value of $\hat{x}_{min,left}$ and keeps the value of $\hat{x}_{min,right}$ constant; this happens due to the setting of $\hat{x}_{min,right}$ to the minimum of $x_i$ and $\hat{x}_{min,right}$.

Due to the effect of pressure changes described in the preceding paragraphs, $\hat{x}_{min}$ may be set equal to the average of $\hat{x}_{min,right}$ and $\hat{x}_{min,left}$. By averaging $\hat{x}_{min,right}$ and $\hat{x}_{min,left}$, the effect of the pressure changes on the estimation of the minimum valve position threshold is decreased.

In some situations, the minimum flow rate threshold ($y_{min}$) may not be available. Accordingly, the present disclosure includes a method for estimating $y_{min}$.

Figure 16:
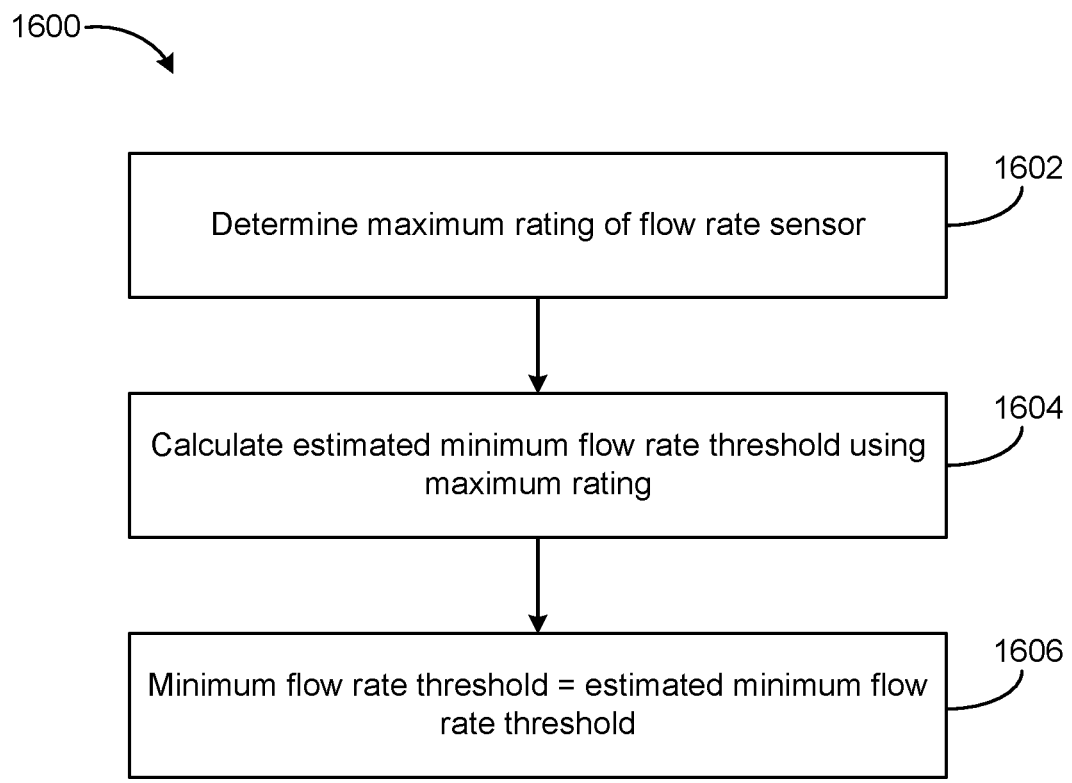
FIG. 16 is a flowchart of a process for estimating a minimum flow rate threshold, according to some embodiments.

Referring now to FIG. 16, a flowchart of a method 1600 for estimating a minimum flow rate threshold is shown. In some embodiments, method 1600 may be performed to accomplish step 1108 of FIG. 11 (i.e. determining a minimum flow rate threshold ($y_{min}$)). Method 1600 includes determining a maximum rating of a flow rate sensor ($y_{max}$) (step 1602). In some embodiments, the maximum rating of the flow rate sensor may be known due to the type of flow rate sensor. Once $y_{max}$ is determined, an estimated minimum flow rate threshold ($\hat{y}_{min}$) may be calculated using the maximum rating (step 1604). In some embodiments, $\hat{y}_{min}$ may be set to a percentage of $y_{max}$. In some embodiments, $\hat{y}_{min}$ may be set to $y_{max}$. Next, the minimum flow rate threshold ($y_{min}$) may be set to the estimated minimum flow rate threshold ($\hat{y}_{min}$) (step 1606).

Initializing $\hat{y}_{min}$ at 100% of the maximum sensor rating value provides a "worst case" estimate, since most of the minimum values are around 10% of the maximum sensor rating. However, initializing with a larger $\hat{y}_{min}$ makes it easier to estimate $y_{min}$ if the actual value is smaller than the initial $\hat{y}_{min}$. Specifically, iterations of the algorithm may decrease $y_{min}$ until it reaches a value very close to $y_{min}$. Conversely, if the initial $\hat{y}_{min}$ is smaller than the actual value, then $\hat{y}_{min}$ may not change and a close estimate of $y_{min}$ may not be reached.

In some embodiments, $\hat{y}_{min}$ may be initialized to a percentage of $y_{max}$, but updated when the flow rate sensor output is greater than zero. Each time the flow rate sensor output is greater than zero, $\hat{y}_{min}$ may be updated to be the minimum of the flow rate ($y_f$) and the current value of $\hat{y}_{min}$.

Figure 17:
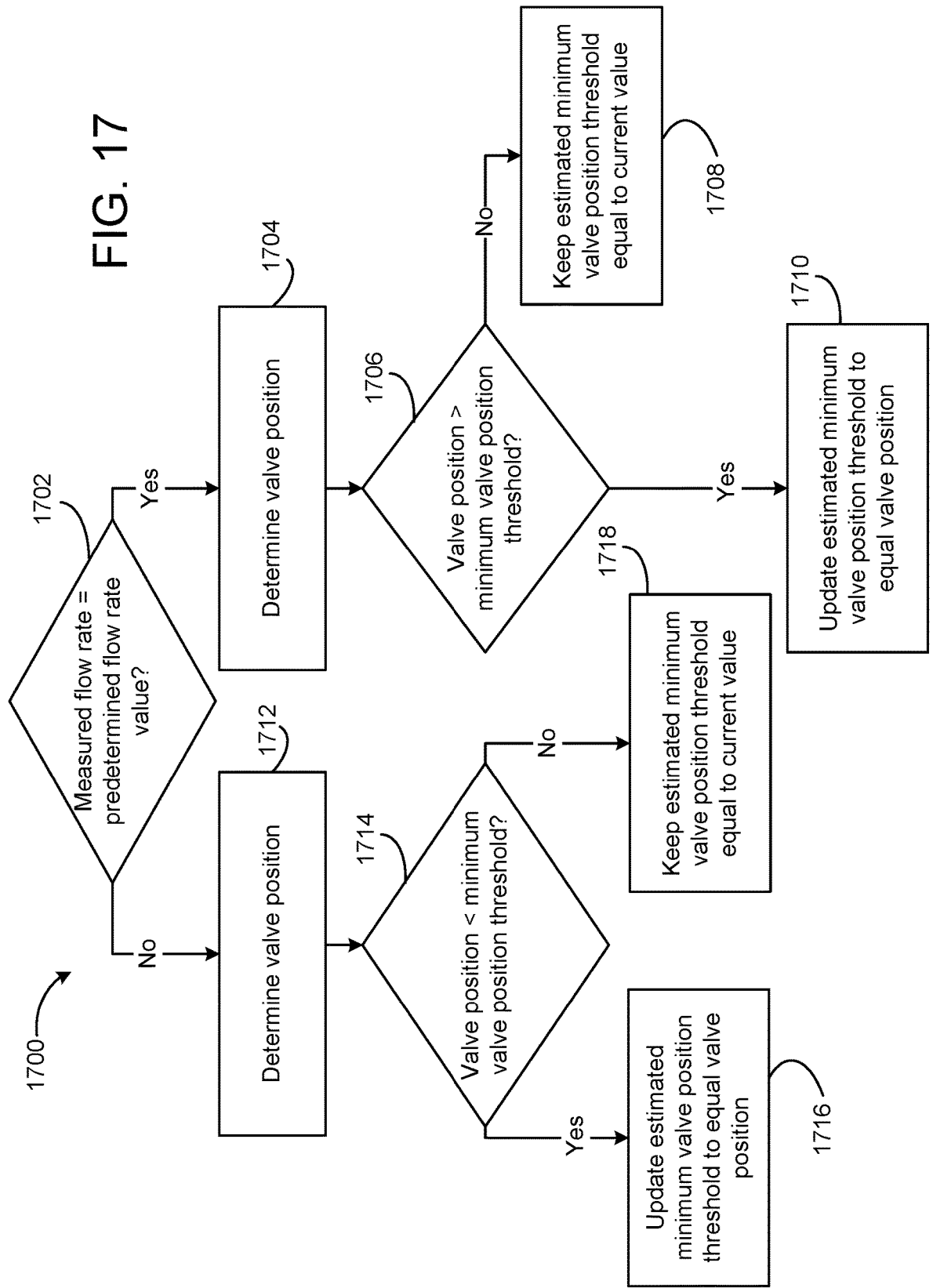
FIG. 17 is a flowchart of a process for estimating a minimum valve position threshold, according to some embodiments.

Referring now to FIG. 17, a flowchart of a method 1700 for estimating a minimum valve position threshold is shown. In some embodiments, method 1700 may be performed to accomplish step 1106 of FIG. 11 (i.e. determining a minimum valve position threshold, $x_{min}$). Method 1700 is shown to include comparing a measured flow rate to a predetermined flow rate value (step 1702). If the measured flow rate is not equal to the predetermined flow rate value (i.e. the result of step 1702 is "no"), a valve position may then be determined (step 1712). Once the valve position is determined, the valve position may be compared to the current minimum valve position threshold (step 1714). If the valve position is less than the minimum valve position threshold (i.e. the result of step 1714 is "yes"), the estimated minimum valve position threshold may be updated to equal the valve position (step 1716). Alternatively, if the valve position is not less than the minimum valve position threshold (i.e., the result of step 1714 is "no"), the estimated minimum valve position threshold may remain equal to its current value (step 1718).

Returning to step 1702, if the measured flow rate is equal to the predetermined flow rate value (i.e. the result of step 1702 is "yes"), a valve position may then be determined (step 1704). Once the valve position is determined, the valve position may be compared to the current minimum valve position threshold (step 1706). If the valve position is greater than the minimum valve position threshold (i.e. the result of step 1706 is "yes"), then the estimated minimum valve position threshold may be updated to equal the valve position (step 1710). Alternatively, if the valve position is not greater than the current minimum valve position threshold (i.e. the result of step 1706 is "no"), then the estimated minimum valve position may remain equal to its current value (step 1708).

Figure 18:
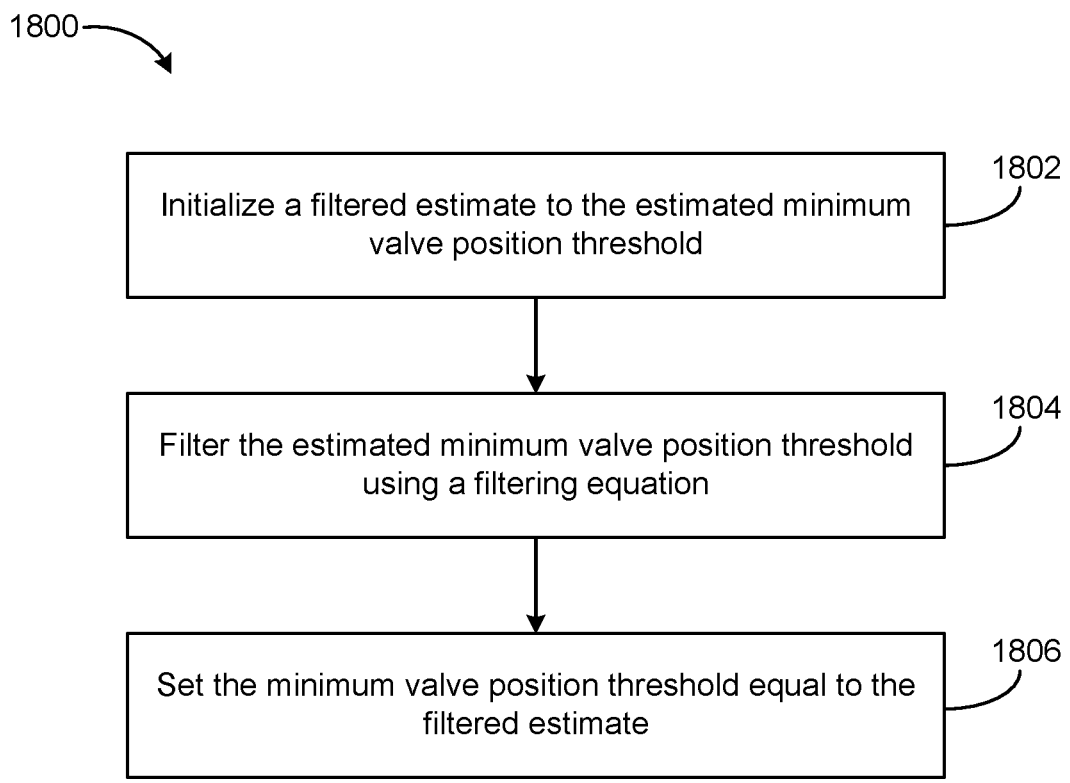
FIG. 18 is a flowchart of a process for filtering an estimated minimum valve position threshold, according to some embodiments.

Referring now to FIG. 18, a flowchart of a method 1800 for filtering an estimated minimum valve position threshold is shown. Method 1800 is shown to include initializing a filtered estimate to equal the estimated minimum valve position threshold (step 1802). In some embodiments, the filtered estimate may be initialized to a different value. Method 1800 is further shown to include filtering the estimated minimum valve position threshold using a filtering equation (step 1804). As previously described, an exponentially weighted moving average (EWMA) may be used to filter the estimated minimum valve position threshold. In other embodiments, different filtering techniques may be used. Method 1800 is shown to include setting the minimum valve position threshold equal to the filtered estimate (step 1806).

Figure 19:
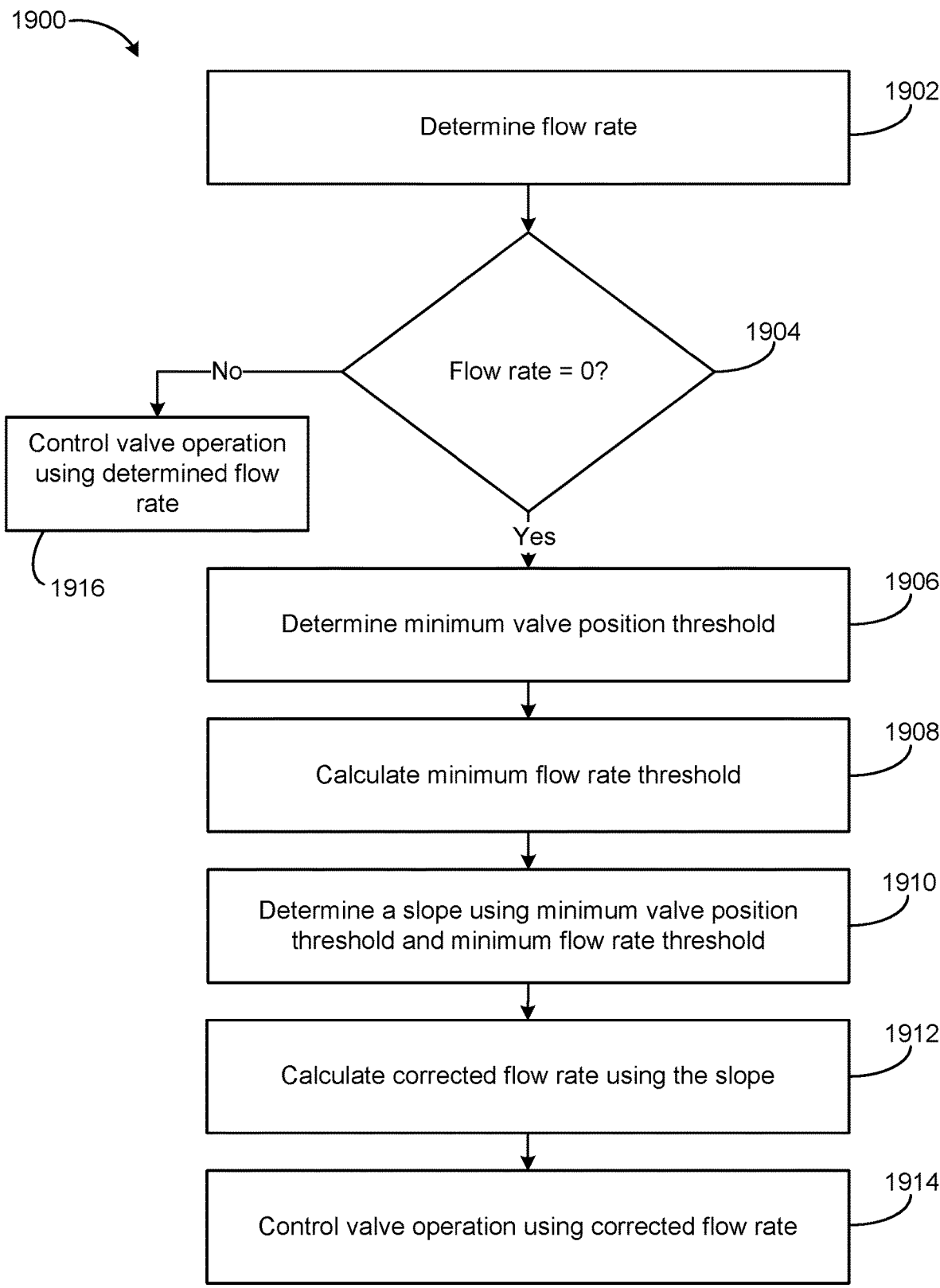
FIG. 19 is a flowchart of another flow rate correction method which may be performed by the controller of FIG. 9, according to some embodiments.

Referring now to FIG. 19, a flowchart of another flow rate correction method 1900 which may be performed by controller 900, is shown. Alternatively, method 1900 may be performed by a different controller. Method 1900 is shown to include determining a flow rate ($y_f$) (step 1902). The determining of the flow rate may be done using any of the flow rate sensors previously described. The measured flow rate ($y_f$) is then compared to a flow rate of zero (step 1904). If the measured flow rate ($y_f$) is not equal to zero (i.e. the result of step 1904 is "no"), the measured flow rate ($y_f$) may then be used to control a valve operation (step 1916).

Alternatively, if the measured flow rate ($y_f$) is equal to zero (i.e. the result of step 1904 is "yes"), a minimum valve position threshold ($x_{min}$) may then be determined (step 1906). Additionally, a minimum flow rate threshold ($y_{min}$) that corresponds to $x_{min}$ may be calculated (step 1908). Once $x_{min}$ and $y_{min}$ are determined, a slope ($y_{min}/x_{min}$) may be determined (step 1910). A corrected flow rate ($\hat{y}_f$) may be calculated using the slope and an indication of valve position (step 1912). Using the corrected flow rate ($\hat{y}_f$), a valve operation may be controlled (step 1914).

In some embodiments, the corrected flow rate ($\hat{y}_f$) may be calculated by performing a linear interpolation between zero and the minimum flow rate threshold ($y_{min}$) as a function of the indication of valve opening position. The linear interpolation may include calculating a slope $$\frac{y_{min}}{x_{min}}$$

and multiplying the slope $$\frac{y_{min}}{x_{min}}$$

by an indication of valve position to calculate the corrected flow rate $\hat{y}_f$.

As one non-limiting example, a function may be used, as shown by Equation 10:

$$\hat{y}_f = \begin{cases} y_f, & \text{if } y_f \neq 0 \\ \frac{y_{min}}{x_{min}} x_i, & \text{otherwise} \end{cases} \quad (10)$$

Accordingly, if the measured flow rate is non-zero, the corrected flow rate may be equal to the measured flow rate. If the measured flow rate is zero, the corrected flow rate may be equal to the calculated slope multiplied by the indication of valve position.

In other embodiments, the corrected flow rate ($\hat{y}_f$) may be calculated by performing a quadratic interpolation between the predetermined flow rate value and the minimum flow rate threshold ($y_{min}$) as a function of the indication of valve position. The quadratic interpolation may include generating a quadratic function that defines the corrected flow rate ($\hat{y}_f$) as a function of the indication of valve position, and using the indication of valve position as an input to the quadratic function to calculate the corrected flow rate ($\hat{y}_f$). In other situations, it may be beneficial to use a different method of approximation (e.g., exponential, cubic, $n^{th}$ order polynomial, etc).

In some embodiments, method 1300, as previously described, may be performed to accomplish step 1906 of FIG. 19 (i.e. determining a minimum valve position threshold ($x_{min}$)). In some embodiments, method 1700, as previously described, may be performed to accomplish step 1906 of FIG. 19 (i.e., determining a minimum valve position threshold ($x_{min}$)). In some embodiments, method 1600, as previously described, may be performed to accomplish step 1908 of FIG. 19 (i.e. calculating a minimum flow rate threshold ($y_{min}$)).

Example 1—Pseudocode

A non-limiting example embodiment is provided via pseudocode:
$y_f$: Measured flow rate
$\hat{y}_f$: Corrected flow rate
$x_i$: Valve opening position
$\hat{x}_{min}$: Estimated minimum valve position threshold $\bar{x}_{min}$: Filtered estimated minimum valve position threshold
$y_{min}$: Minimum flow rate threshold
$y_{max}$: Maximum rating
$\hat{y}_{min}$: Estimated minimum flow rate threshold
$g(x_i, \hat{x}_{min}, \hat{y}_{min})$: Interpolation function
α: Filter weight
h: Sample rate
$\tau_a$: Time constant
Initialization
$\hat{x}_{min} \leftarrow 100$
$\hat{y}_{min} \leftarrow y_{max}$
$\alpha \leftarrow e^{-h/\tau_a}$
$\bar{x}_{min} \leftarrow \hat{x}_{min}$
Minimum Valve Position Threshold Estimation

```
if y_f ≠ 0 then
    x̂_min ← min(x̂_min, x_i)
    x̄_min ← x̄_min + α(x̂_min − x̄_min)
    ŷ_min ← min(ŷ_min, y_f)
    ŷ_f ← y_f
else
    x̂_min ← max(x̄_min, x_i)
    x̄_min ← x̄_min + α(x̂_min − x̄_min)
    ŷ_f ← g(x_i, x̂_min, ŷ_min)
end if
```

Example 2—Pseudocode

Another non-limiting example embodiment is provided via pseudocode:
Variables
$y_f$: Measured flow rate
$\hat{y}_f$: Corrected flow rate
$x_i$: Valve opening position
$\hat{x}_{min,left}$: First minimum valve position threshold
$\hat{x}_{min,right}$: Second minimum valve position threshold
$\hat{x}_{min}$: Estimated minimum valve position threshold
$y_{min}$: Minimum flow rate threshold
$y_{max}$: Maximum rating
$\hat{y}_{min}$: Estimated minimum flow rate threshold
Initialization
$\hat{x}_{min,right} \leftarrow 100$
$\hat{x}_{min,left} \leftarrow 0$
$\hat{y}_{min} \leftarrow 0.2 y_{max}$
Minimum Valve Position Threshold Estimation

```
if y_f ≠ 0 then
    x̂_min,right ← min(x̂_min,right, x_i)
    ŷ_min ← min(ŷ_min, y_f)
    ŷ_f ← y_f
else
    x̂_min,left ← max(x̂_min,left, x_i)
    x̂_min ← 1/2(x̂_min,left + x̂_min,right)

ŷ_f ← (ŷ_min / x̂_min) x_i end if
```

Example—Simulation

A non-limiting example simulation was performed to evaluate and compare the performance of a control system with the output compensation systems and methods proposed in the present disclosure. Flow rate sensors with different $y_{max}$ and $y_{min}$ values, and valves with different flow coefficients were used in the simulation for this purpose. The case of not using a compensation method was also tested. The results were compared to a benchmark case where it was assumed that a perfect valve rejects pressure disturbances immediately. The method outlined by "Example 2" was implemented during the simulation.

Figure 20D:
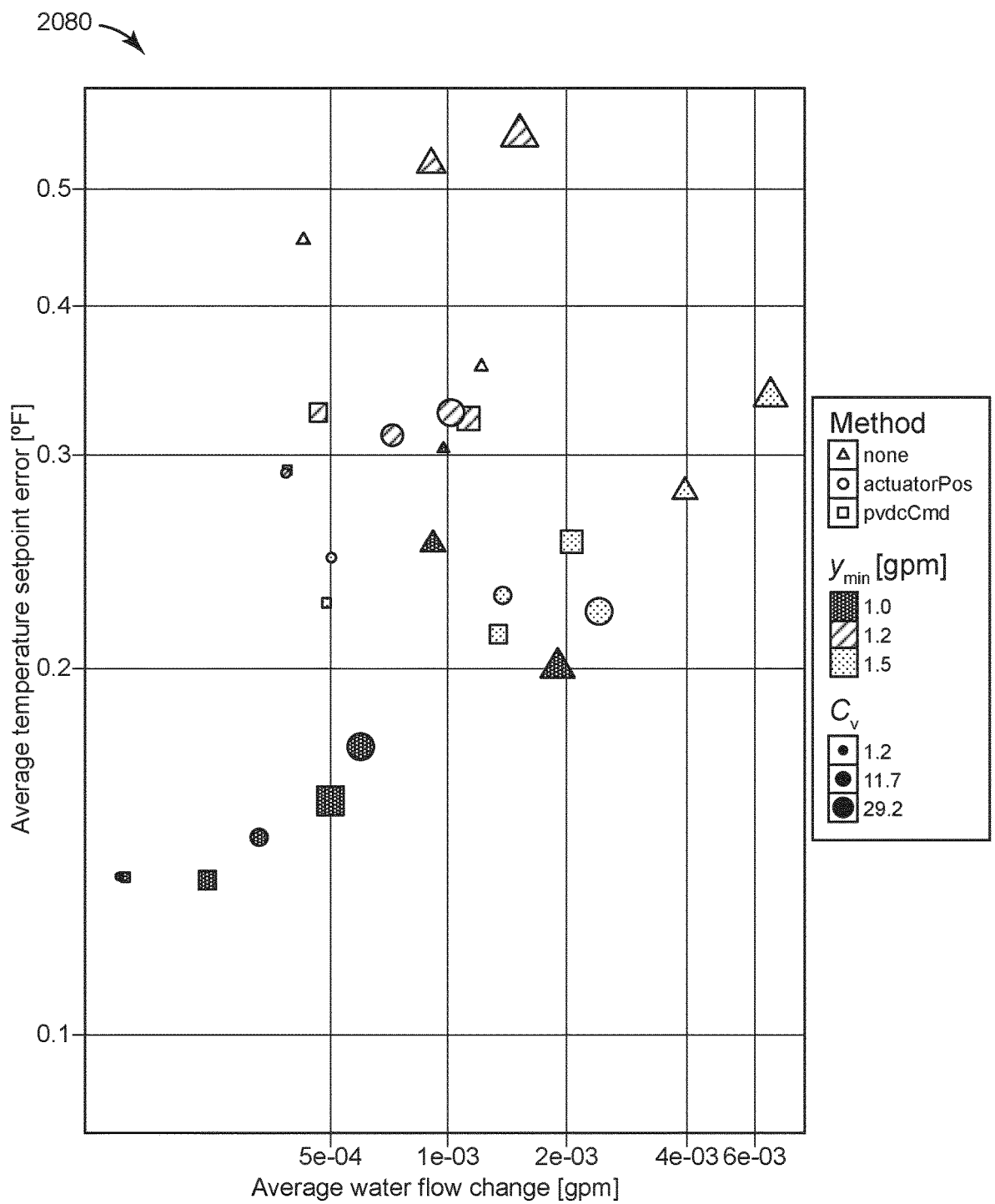
FIG. 20D is a graph illustrating the simulation results from the block diagrams of FIG. 20B and FIG. 20C, according to some embodiments.

Referring to FIGS. 20A-20D, the non-limiting example simulation and results are shown. FIG. 20A is a table 2005 of flow rate sensor parameters used in the example simulation. As shown, $y_{max}$ was set to 12, 15, and 15, with $y_{min}$ set to 1.2, 1.5, and 1, respectively. The corresponding noise levels (G) were 0.54, 0.27, and 0.07.

The simulated system 2000 and benchmark system 2050 are shown in FIGS. 20B and 20C, respectively. Both systems 2000 and 2050 include a loop that controls a zone temperature with a pattern recognition adaptive controller (PRAC) 2010, however, the simulated system 2000 contains an inner loop 2045 that controls the water flow that goes into the heating coil 2040.

In the inner loop 2045, the flow is controlled with a proportional variable deadband controller (PVDC) 2015, the command from controller 2015 is sent to the actuator 2025 which adjusts the valve opening; the flow in the valve 2030 is measured by the flow sensor 2035 which sends the signal to the flow compensation block 2020. In this block, the output compensation methods and algorithms are used. Three cases were tested: 1) no flow compensation performed, 2) a flow compensation was performed using the position value from the actuator, and 3) a flow compensation algorithm was used with the valve command from the PVDC.

In practice, it is not uncommon that valves and sensors be poorly sized. If this happens, the worst possible case would be when a valve is undersized and the flow sensor is oversized; this situation would put a large portion of the valve flow in the unmeasurable range of the flow sensor. Because of this reason, the largest of three flow sensors of a list of possible devices were used in the simulation system 2000, and were paired with small, medium and large valves. The flow coefficients of the valves were $C_v = [1.2, 11.7, 29.2]$.

Referring to FIG. 20C, the benchmark system 2050 assumes that the flow command from PRAC is achieved by the valve immediately and because of that, the signal goes directly into the heating coil. The conditions in the benchmark system 2050 are the same as the conditions of the outer loop in the simulation system 2000 cases.

Referring to FIG. 20D, the performance results for the different valves, flow sensors and output compensation methods are shown in graph 2080. The x-axis shows the average water flow movement in the valve as an approximation of the actuator effort, and the y-axis shows the average temperature setpoint error at each sample time. The shape of the points correspond to the output compensation method used: the triangles correspond to results where no output compensation was used, the circles correspond to results where the actuator position was used in the output compensation method, and the squares correspond to results where the valve command from the PVDC was used in the output compensation method.

Still referring to graph 2080, the fill pattern of the shapes correspond to the $y_{min}$ for each of the sensors, and the size of the points correspond to the size of the valve, represented by the valve flow coefficient. The benchmark system 2050 result is the black dot shown on the bottom left of graph 2080—the closer that the points are to this black dot, the better the performance.

The results depicted in graph 2080 show that the control performance improves in all cases when an output compensation method is used, regardless of what signal is used in the algorithms. This is evidenced by all of the triangles being plotted above or to the right of the results from the other methods. Furthermore, the difference in performance obtained when the actuator position or PVDC command were used is minimal for small valves. For sensors with small $y_{min}$ values, the average error does not significantly increase when the valve size increases, but the actuator effort does.

Pulse-Width Modulation Flow Compensation

Figure 22:
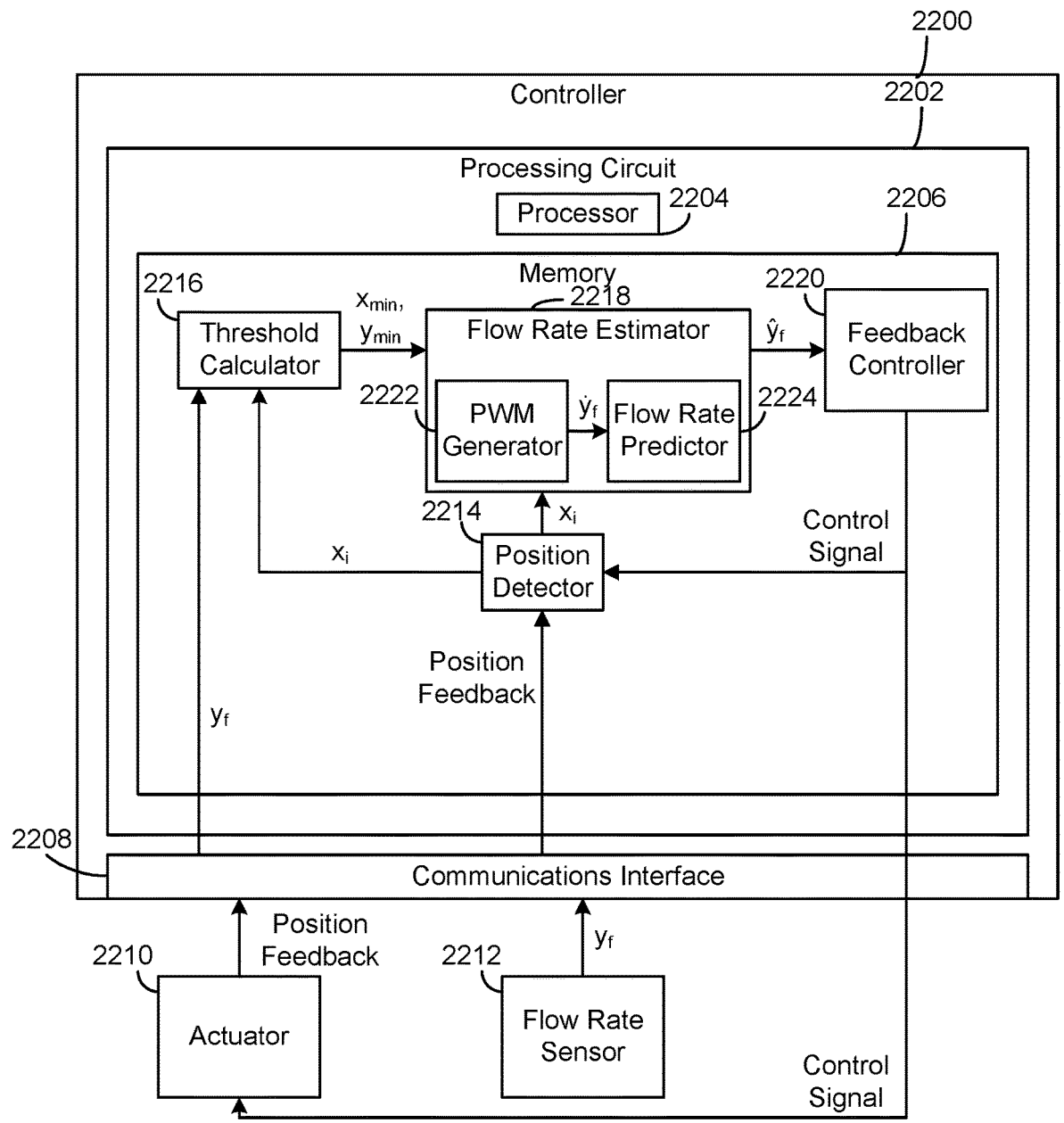
FIG. 22 is a block diagram of a controller with a PWM generator, according to some embodiments.

Referring now to FIG. 22, a block diagram illustrating controller 2200 in detail is shown, according to one embodiment. Controller 2200 can be used as controller 614 in system 600 and/or controller 714 in system 700. Controller 2200 is shown to include a communications interface 2208 and a processing circuit 2202. Communications interface 2208 may include wired or wireless interfaces (e.g., jacks, antennas, transmitters, receivers, transceivers, wire terminals, etc.) for conducting data communications with various systems, devices, or networks. For example, communications interface 2208 may include an Ethernet card and port for sending and receiving data via an Ethernet-based communications network and/or a WiFi transceiver for communicating via a wireless communications network. Communications interface 2208 may be configured to communicate via local area networks or wide area networks (e.g., the Internet, a building WAN, etc.) and may use a variety of communications protocols (e.g., BACnet, IP, LON, etc.).

Communications interface 2208 may be a network interface configured to facilitate electronic data communications between controller 2200 and various external systems or devices (e.g., actuator 2210, flow rate sensor 2212, etc.). Controller 2200 may receive position feedback from actuator 2210 and measured flow rates ($y_f$) from flow rate sensor 2212. Controller 2200 may be configured to output a corrected flow rate ($\hat{y}_f$) to feedback controller 2220, as well as receive a control signal from feedback controller 2220.

Processing circuit 2202 is shown to include a processor 2204 and memory 2206. Processor 2204 may be a general purpose or specific purpose processor, an application specific integrated circuit (ASIC), one or more field programmable gate arrays (FPGAs), a group of processing components, or other suitable processing components. Processor 2204 may be configured to execute computer code or instructions stored in memory 2206 or received from other computer readable media (e.g., CDROM, network storage, a remote server, etc.).

Memory 2206 may include one or more devices (e.g., memory units, memory devices, storage devices, etc.) for storing data and/or computer code for completing and/or facilitating the various processes described in the present disclosure. Memory 2206 may include random access memory (RAM), read-only memory (ROM), hard drive storage, temporary storage, non-volatile memory, flash memory, optical memory, or any other suitable memory for storing software objects and/or computer instructions. Memory 2206 may include database components, object code components, script components, or any other type of information structure for supporting the various activities and information structures described in the present disclosure. Memory 2206 may be communicably connected to processor 2204 via processing circuit 2202 and may include computer code for executing (e.g., by processor 2204) one or more processes described herein.

Still referring to FIG. 22, controller 2200 is shown to include a threshold calculator 2216. Threshold calculator 2216 is shown receiving the measured flow rate ($y_f$) from flow rate sensor 2212. Additionally, threshold calculator 2216 may receive a valve opening position ($x_i$) from a position detector 2214. Threshold calculator 2216 may calculate a minimum valve position threshold ($x_{min}$) and/or a minimum flow rate threshold ($y_{min}$) for a given valve, in accordance with the methods described herein. $x_{min}$ and $y_{min}$ may be provided as an input to a flow rate estimator 2218.

Flow rate estimator 2218 is shown receiving $x_{min}$ and $y_{min}$ from threshold calculator 2216, as well as the valve opening position ($x_i$) from position detector 2214. Flow rate estimator 2218 may be configured to use the inputs $x_{min}$, $y_{min}$, and $x_i$ to calculate a corrected flow rate ($\hat{y}_f$). $\hat{y}_f$ may be provided as an input to feedback controller 2220.

In some embodiments, flow rate estimator 2218 may include a PWM generator 2222 and a flow rate predictor 2224. PWM generator 2222 may be used to generate a pulse-width modulated signal ($\dot{y}_f$). $\dot{y}_f$ may be provided as an input to flow rate predictor 2224. In some embodiments, flow rate predictor 2224 may use the PWM signal ($\dot{y}_f$) to determine a corrected flow rate ($\hat{y}_f$).

The generation of the PWM signal $\dot{y}_f$ by PWM generator 2222 is described in detail below, with respect to FIGS. 22-24. In some embodiments, for example, PWM generator 2222 may switch between zero and $y_{min}$ to generate the PWM signal $\dot{y}_f$.

Feedback controller 2220 is shown receiving $\hat{y}_f$ from flow rate estimator 2218. Based on $\hat{y}_f$, feedback controller 2220 may determine a control signal (e.g., an associated output voltage) that may be provided to actuator 2210 to further open or close the associated valve opening. The control signal may be provided as an input to actuator 2210, and/or to position detector 2214.

Providing the control signal from feedback controller 2220 to position detector 2214 may provide a distinct benefit. The methods described herein use the valve opening position ($x_i$) in the calculations to determine $\hat{y}_f$. The valve opening position ($x_i$) may be provided by the position of the valve actuator (e.g., actuator 2210). However, there may be valves that are unable to expose the actuator position to position detector 2214. In these situations, it may be beneficial to use the control signal directly from feedback controller 2220 as a proxy for $x_i$. Since the valve should eventually open or close according to the value of the control signal, as provided by feedback controller 2220, it may be beneficial to use the control signal when the actuator position cannot be exposed, or when it is otherwise difficult to use.

Still referring to FIG. 22, position detector 2214 is shown receiving the control signal from feedback controller 2220, and the position feedback from actuator 2210. In some embodiments, position detector 2214 may only receive one of the position feedback or the control signal, for reasons discussed in the preceding paragraphs. In other embodiments, position detector 2214 may receive both the position feedback and the control signal as inputs. Position detector 2214 is configured to calculate a valve opening position ($x_i$) using position feedback and/or the control signal. Position detector 2214 may provide $x_i$ to both threshold calculator 2216 and flow rate estimator 2218.

In some embodiments, actuator 2210 may be the same or similar to actuator 910, flow rate sensor 2212 may be the same or similar to flow rate sensor 912, and controller 2200 may be the same or similar to controller 900.

Figure 23:
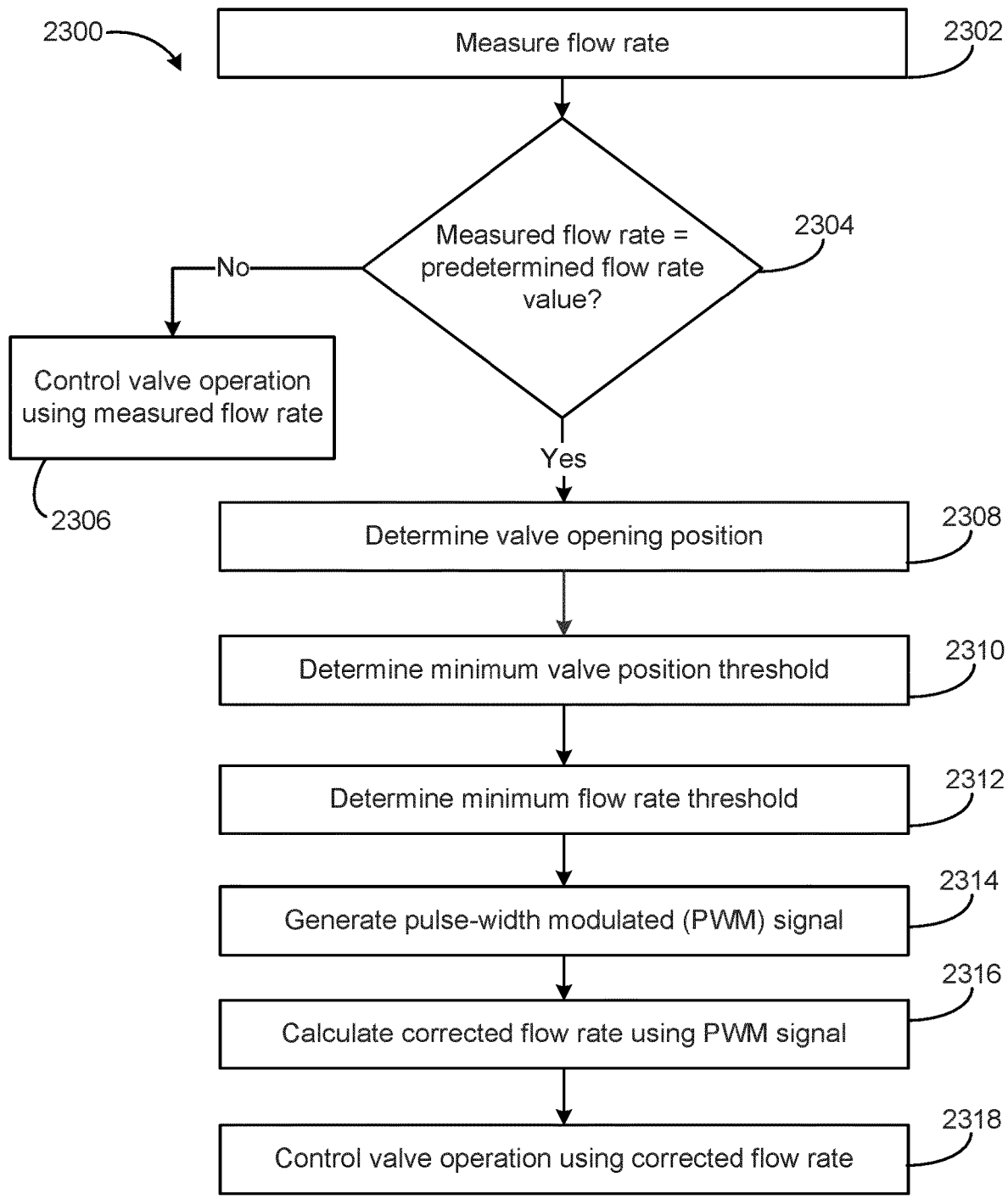
FIG. 23 is a flowchart of a flow rate correction method which may be performed by the controller of FIG. 22, according to some embodiments.

Referring now to FIG. 23, a flowchart of a flow rate correction method 2300 which may be performed by controller 2200, is shown. Alternatively, the flow rate correction method 2300 may be performed by a different controller (e.g., controller 900). Method 2300 is shown to include measuring a flow rate ($y_f$) (step 2302). The measuring of the flow rate may be done using any of the flow rate sensors previously described. The measured flow rate ($y_f$) is then compared to a predetermined flow rate value (step 2304). In some embodiments, the predetermined flow rate value is zero.

If the measured flow rate ($y_f$) is not equal to the predetermined flow rate value (i.e., the result of step 2304 is "no"), the measured flow rate ($y_f$) may then be used to control a valve operation (step 2306). This may occur, for example, when the measured flow rate ($y_f$) is non-zero. Alternatively, if the measured flow rate ($y_f$) is equal to the predetermined flow rate value (i.e., the result of step 2304 is "yes"), a valve opening position may then be determined (step 2308). Additionally, a minimum valve position threshold ($x_{min}$) may then be determined (step 2310). Next, method 2300 is shown to include determining a minimum flow rate threshold ($y_{min}$) that corresponds to $x_{min}$ (step 2312).

In some embodiments, method 1300, as previously described, may be performed to accomplish step 2310 of FIG. 23 (i.e. determining a minimum valve position threshold ($x_{min}$)). In some embodiments, method 1700, as previously described, may be performed to accomplish step 2310 of FIG. 23 (i.e., determining a minimum valve position threshold ($x_{min}$)). In some embodiments, method 1600, as previously described, may be performed to accomplish step 2312 of FIG. 23 (i.e. calculating a minimum flow rate threshold ($y_{min}$)).

Once $x_{min}$ and $y_{min}$ are determined, a PWM signal may be generated (step 2314). The generation of the PWM signal is described in detail below, with respect to FIGS. 22-24. Next, a corrected flow rate ($\hat{y}_f$) may be calculated using the pulse-width modulated (PWM) signal (step 2316). A valve operation may then be controlled using $\hat{y}_f$ (step 2318).

Figure 24:
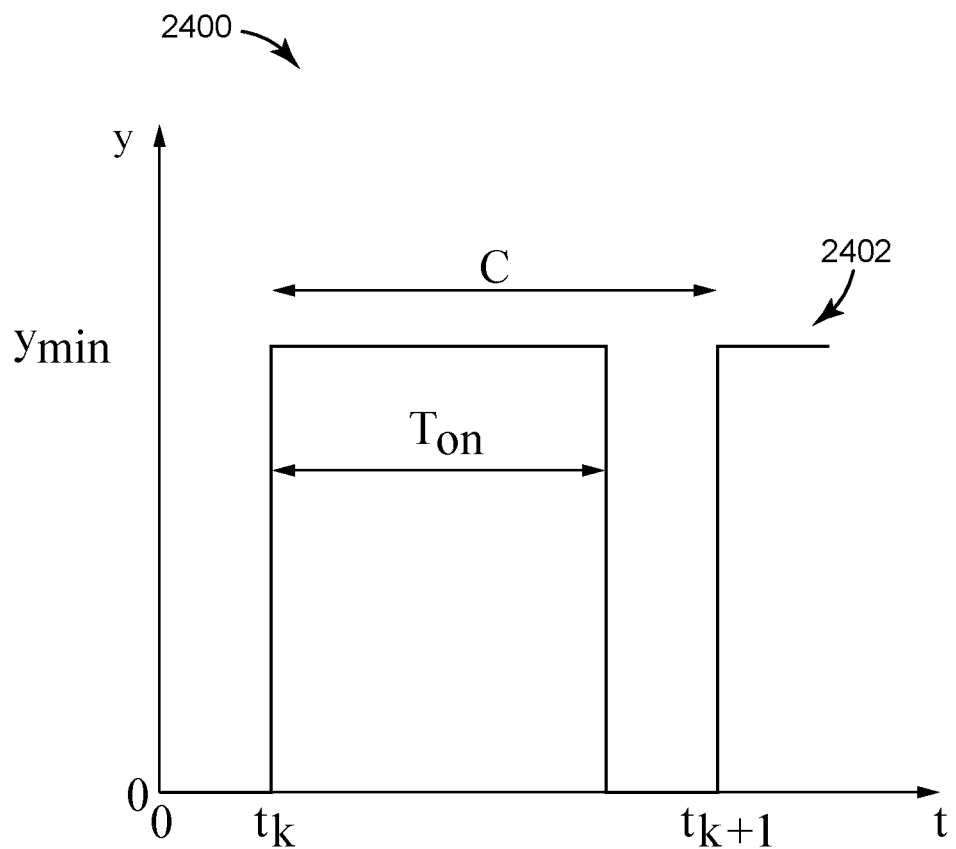
FIG. 24 is a graph illustrating a pulse-width modulation (PWM) function which may be used by the block diagram of FIG. 22, according to some embodiments.

Referring now to FIG. 24, a graph 2400 of a pulse-width modulated (PWM) signal 2402 is shown, according to some embodiments. In some embodiments, a PWM signal 2402 may be generated by PWM generator 2222, as described above.

Graph 2400 includes an x-axis corresponding to time (t), and a y-axis corresponding to flow rate values (y) As shown, PWM signal 2402 alternates between 0 and $y_{min}$ as t increases. Additionally, graph 2400 illustrates a period (C) corresponding to PWM signal 2402. A pulse width ($T_{on}$) indicates the duration of the period (C) during which PWM signal 2402 has a value of $y_{min}$, and is shown beginning at time $t_k$ and ending at time $t_k+T_{on}$. Following time $t_k+T_{on}$, PWM signal 2402 has a value of 0 for the remainder of the period (C) until the beginning of the next pulse period at time $t_{k+1}$.

With reference to FIGS. 22-24, systems and methods for correcting a flow rate using a PWM signal are shown, according to some embodiments. In some embodiments, flow rate estimator 2218 may allow the measured flow rate ($y_f$) to pass unmodified if $y_f$ is larger than or equal to a minimum flow rate threshold ($y_{min}$). Otherwise (i.e., if the measured flow rate is less than the minimum flow rate threshold ($y_{min}$)), flow rate estimator 2218 may use a generated signal (e.g., PWM signal 2402) to determine a corrected flow rate ($\hat{y}_f$). The PWM signal (e.g., PWM signal 2402), may switch between the values of 0 and $y_{min}$:

$$\dot{y}_f = \begin{cases} y_{min} & \text{for } t_k < t \le (t_k + T_{on}) \\ 0 & \text{for } (t_k + T_{on}) < t \le (t_k + C) \end{cases} \quad (11)$$

with $$t_{k+1} = (t_k + C) \quad (12)$$

and $$T_{on} \le C \quad (13)$$

Accordingly, in some embodiments, the correct flow rate ($\hat{y}_f$) (here, the average value of the PWM signal) may be:

$$\hat{y}_f = \left(\frac{T_{on}}{C}\right) y_{min} \quad (14)$$

In some embodiments, the period (C) may be a function of the dynamics of the corresponding valve 2206. Accordingly, in some situations, C may be a function of the stroke time of the actuator 2204 ($\tau_a$). The period may be selected as a multiple of the stroke time:

$$C = n\tau_a \quad (15)$$

where n may be any positive integer. In some embodiments, it may be beneficial to select an n value often. Accordingly, the period may be $C=10\tau_a$.

In some embodiments, the value for $T_{on}$ may be calculated as:

$$T_{on} = rC \quad (16)$$

where r may be the ratio of the position of the valve ($x_i$) and the minimum valve position threshold ($x_{min}$):

$$r = \frac{x_i}{x_{min}} \quad (17)$$

The ratio (r) may be calculated using the assumption that $x_i \le x_{min}$ when the flow rate is lower than a minimum readable flow, so that $r \le 1$. Accordingly, the corrected flow rate ($\hat{y}_f$) may be proportional to $y_{min}$ in the same way that $x_i$ is proportional to $x_{min}$ (i.e., $$\frac{\hat{y}_f}{y_{min}} = \frac{x_i}{x_{min}}).$$

Example 3—Pseudocode

A non-limiting example embodiment is provided via pseudocode:
Variables
$y_f$: Measured flow rate
$\dot{y}_f$: PWM signal
$\hat{y}_f$: Corrected flow rate
$y_{min}$: Minimum flow rate threshold
$x_i$: Valve opening position
$\hat{x}_{min}$: Estimated minimum valve position threshold
$\tau_a$: Actuator stroke time
$t_r$: Internal pulse running time
C: Pulse period
$T_{on}$: Pulse duration
h: Sample rate Initialization
$\hat{x}_{min} \leftarrow 100$
$t_r \leftarrow 0$
$C \leftarrow 10\tau_a$
Output Prediction

--- if $y_f \le y_{min}$ then
   $t_r \leftarrow t_r + h$
   $\hat{x}_{min} \leftarrow \max(\hat{x}_{min}, x_i)$ $r \leftarrow \dfrac{x_i}{x_{min}}$ $T_{on} \leftarrow rC$
   if $t_r \le T_{on}$ then
     $\hat{y}_f \leftarrow y_{min}$
   else
     $\hat{y}_f \leftarrow 0$
   end if
   if $t_r \ge C$ then
     $t_r \leftarrow 0$
   end if
else
   $t_r \leftarrow 0$
   $\hat{x}_{min} \leftarrow \min(\hat{x}_{min}, x_i)$
   $\hat{y}_f \leftarrow y_f$
end if

---

Example—Pulse-Width Modulation Simulation

Another non-limiting example simulation was performed to evaluate and compare the performance of a control system with the PWM output compensation systems and methods proposed in the present disclosure. The method outlined by "Example 3" was implemented during the simulation. The performance of PWM for flow output prediction was evaluated with a simulation of a cascaded control system used to regulate a zone temperature. Flow rate estimator 2218 may be imbedded in inner loop 2045 that controls the water flow in the example system shown in FIG. 20B.

A sensor with a rating of 12 gpm was used to measure the water flow through the valve. Four minimum readable flow values were used to test the performance of the different functions. The values of $y_{min}$ were 0, 1.2, 2.4, and 6 gpm. The noise level in the sensor had a standard deviation of 0.01 gpm. The effect of the valve size was tested by using three different flow coefficients ($C_v$): 1.2, 11.7, and 29.2. The potential disturbances in the system included temperature setpoint changes, pressure drop changes, and changes in occupancy and lighting.

The present simulation ran for 120 hours and the performance statistics were calculated 48 hours to allow the PI controller to be properly tuned. The sampling period of the simulation was one second.

Benchmark system 2050 as described with respect to FIG. 20C was used as a baseline for the performance results. Benchmark system 2050 assumes that the flow command from PRAC is achieved by the valve immediately and because of that, the signal goes directly into the heating coil. This causes the setpoint fed to PVDC 2015 to be achieved immediately, regardless of pressure changes, minimum readable flows and noise in the flow sensor. The conditions in the benchmark system 2050 are the same as the conditions of the outer loop in the simulation system 2000 cases.

The performance metrics used in the simulation were the actuator effort and the average temperature setpoint error. The average setpoint error was calculated as:

$$\bar{e}_k = \frac{1}{N}\sum_{k=1}^{N} |r_k - T_k| \tag{18}$$

and the average effort in the actuator was calculated as:

$$\overline{\delta u}_k = \frac{1}{N-1}\sum_{k=1}^{N-1} |u_{k+1} - u_k| \tag{19}$$

Since there is no measure of the actuator effort in the benchmark system 2050, the change in the water flow within the valve was used as an indication of actuator effort, such that the average change in water flow was calculated as:

$$\overline{\delta w}_k = \frac{1}{N-1}\sum_{k=1}^{N-1} |y_{k+1} - y_k| \tag{20}$$

Figure 25:
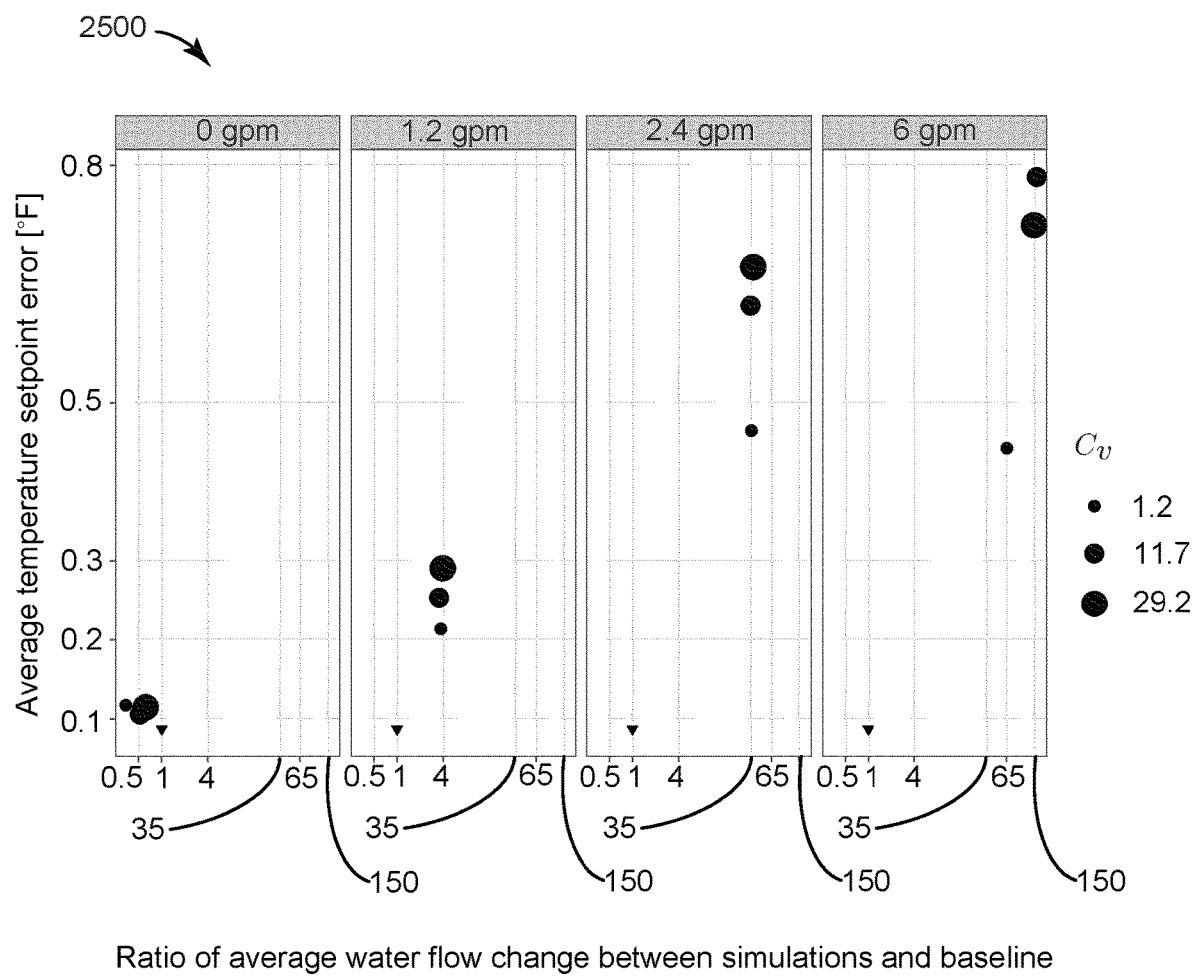
FIG. 25 is a graph illustrating PWM simulation results from the block diagrams of FIG. 20B and FIG. 20C, according to some embodiments.
Figure 26:
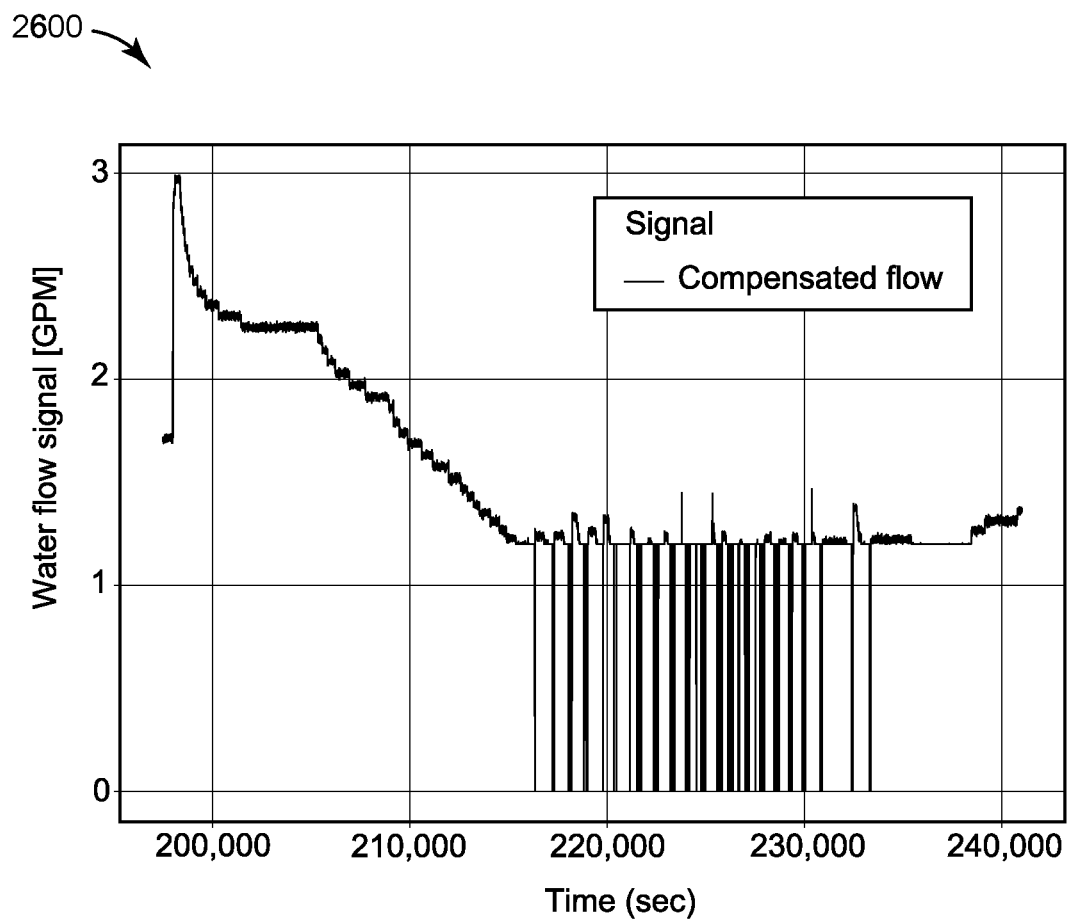
FIG. 26 is a graph illustrating signal output simulation results from the block diagrams of FIG. 20B and FIG. 20C, according to some embodiments.
Figure 27:
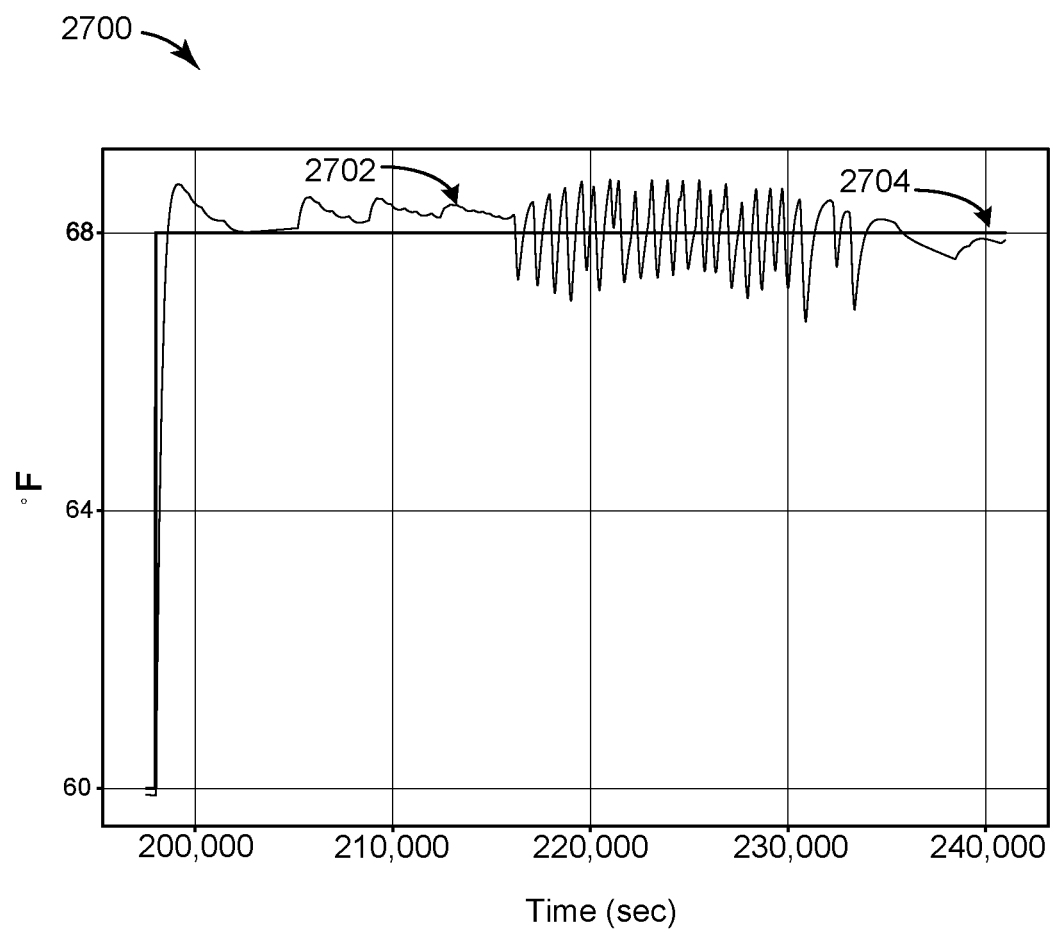
FIG. 27 is a graph illustrating zone temperature simulation results from the block diagrams of FIG. 20B and FIG. 20C, according to some embodiments.
Figure 28:
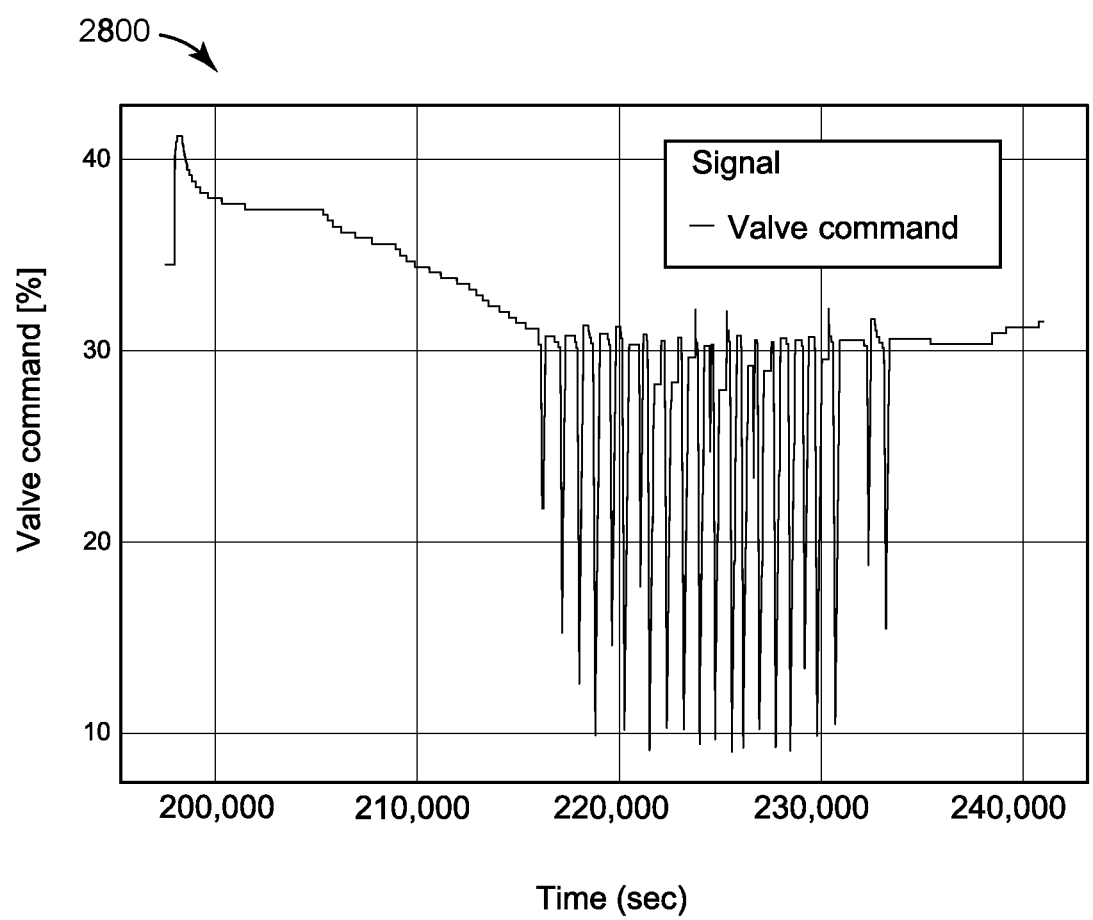
FIG. 28 is a graph illustrating flow controller simulation results from the block diagrams of FIG. 20B and FIG. 20C, according to some embodiments.

FIG. 25 shows the performance results for the different valves and the minimum readable flows in the sensor functions. FIGS. 26-28 show timeseries values of the temperature, valve command and PWM signal for the case when $y_{min}=1.2$ gpm.

In FIG. 25, the x-axis of graph 2500 shows the ratio between the average water flow change obtained in the simulations with the PWM signal, and the average water flow change obtained in the benchmark case. The y-axis shows the average temperature setpoint error. The size of each point corresponds to the valve coefficient. Each subplot shows the results for different minimum readable values of the sensors. The benchmark result is represented by the black inverted triangle.

When $y_{min}=0$ gpm, all the flow values are read by the sensor. In this case the results are very close to the benchmark; the only difference is made by the size of the valve. The average temperature setpoint error is slightly larger than the benchmark result, however, the average water flow change is half of the benchmark result.

For $y_{min}=1.2$ gpm, the average setpoint error and water flow change increase; however, the setpoint error is still within 0.2° F. of the benchmark case. The water flow change is around four times the change in the benchmark.

For $y_{min}=2.4$ and $y_{min}=6$, almost no flow is read by the sensor; this makes the control system use exclusively the flow signals from the pulse-width modulator. Because of this reason, the average water flow movement across the valve increases dramatically due to the prolonged oscillations. It can be seen that the ratios for the average water flow change go from 35 to 150. The dramatic increase in controller effort yields an average setpoint error smaller than 0.8° F.

FIG. 26 shows the behavior of the signal that comes out of the prediction function for a case with $y_{min}=1.2$ gpm, and $C_v=11.7$ using graph 2600. It can be seen that when the signal goes below 1.2 gpm it starts oscillating between 0 and 1.2 gpm according to the PWM algorithm. The response to the controlled temperature to these changes in the flow signal are shown in graph 2700 of FIG. 27. It can be seen that the temperature 2702 oscillates around the setpoint 2704, and it does not deviate for more than 1° F. FIG. 28 shows the command signal sent by the flow controller, and how it oscillates when the water flow is below the $y_{min}$, via graph 2800.

Example—Controller

Figure 21:
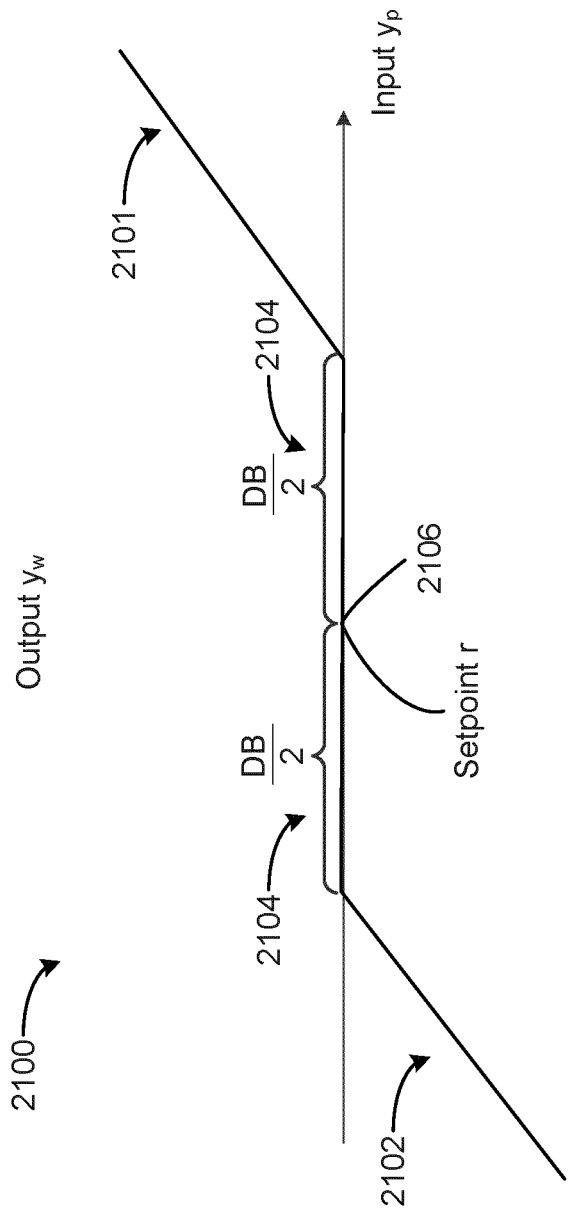
FIG. 21 is a graph illustrating the function of a proportional variable deadband controller (PVDC) which may be implemented in the present disclosure, according to some embodiments.

As described above, a proportional variable deadband controller (PVDC) 2015 may be used to control the valve flow, according to the present disclosure. FIG. 21 is a graph illustrating the function of a PVDC. In some embodiments, controller 614 (as shown in FIG. 6) may include a PVDC. Alternatively, in other embodiments, controller 714 (as shown in FIG. 7) may include a PVDC.

In some embodiments, the PVDC includes a deadband filter. The deadband filter may be configured to filter one or more of the measurements ($y_p$) to generate one or more filtered measurements ($y_w$). In some embodiments, the deadband filter determines whether each measurement ($y_p$) is within a deadband range centered around a setpoint (r) for the measured variable ($y_p$). The setpoint (r) may be provided as an input the PVDC.

If the measurement ($y_p$) is within the deadband range (i.e., $$r - \frac{DB}{2} \leq y_p \leq r + \frac{DB}{2}),$$

the deadband filter may set the filtered measurement ($y_w$) equal to the setpoint (r). However, if the measurement ($y_p$) is outside the deadband range (i.e., $$y_p < r - \frac{DB}{2} \text{ or } y_p > r + \frac{DB}{2}),$$

the deadband filter may add or subtract the deadband threshold $$\frac{DB}{2}$$

from the measurement ($y_p$) to bring the filtered measurement ($y_w$) closer to the setpoint (r). The following equation illustrates the calculation which may be performed by the deadband filter to generate each filtered measurement ($y_w$) as a function of the corresponding raw measurement ($y_p$):

$$y_w = \begin{cases} r & \text{if } |r - y_p| \leq \frac{DB}{2} \\ r - \text{sign}(r - y_p)\left(|r - y_p| - \frac{DB}{2}\right) & \text{if } |r - y_p| > \frac{DB}{2} \end{cases}$$

A graph 2100 illustrating the operation of a deadband filter is shown in FIG. 21. The horizontal axis of graph 2100 represents the measurement ($y_p$) provided as an input to the deadband filter, whereas the vertical axis of graph 2100 represents the filtered measurement ($y_w$) provided as an output of the deadband filter. The center point 2106 of graph 2100 is equal to the setpoint (r) for measured variable ($y_p$). For example, if measured variable ($y_p$) is a room temperature, and the setpoint (r) for the room temperature is 70° F., the center point 2106 of graph 2100 may have a value of 70° F.

Graph 2100 is shown to have two sections: a slope section 2102 and a deadband section 2104. Deadband section 2104 has a range of $$\pm \frac{DB}{2}$$

on either side of the setpoint (r). If the input ($y_p$) to the deadband filter falls within deadband section 2104 (i.e., $$r - \frac{DB}{2} \leq y_p \leq r + \frac{DB}{2}),$$

the output ($y_w$) of the deadband filter is equal to the setpoint (r). However, if the input ($y_p$) to the deadband filter falls within slope section 2102, (i.e., $$y_p < r - \frac{DB}{2} \text{ or } y_p > r + \frac{DB}{2}),$$

the output ($y_w$) of the deadband filter is a linear function of the input ($y_p$) and is shifted closer to the setpoint (r) by an amount equal to the deadband threshold $$\left(\frac{DB}{2}\right).$$

For example, if the input ($y_p$) falls within slope section 2102 and is less than the setpoint (r), then the output ($y_w$) is equal to $$y_p + \frac{DB}{2}.$$

However, if the input ($y_p$) falls within slope section 2102 and is greater than the setpoint (r), then the output ($y_w$) is equal to $$y_p - \frac{DB}{2}.$$

Advantageously, the deadband filter operates to reduce the integrated error of the measured variable ($y_p$) relative to the setpoint (r) by establishing a deadband section 2104 around the setpoint (r) (i.e., $$r \pm \frac{DB}{2}).$$

If the measurement ($y_p$) falls within deadband section 2104, the filtered measurement ($y_w$) will be equal to the setpoint (r) and the error $e = r - y_w$ will be equal to zero. This ensures that the controller may not accumulate a large integrated error (e.g., $\Sigma_{i=1}^{n} e_i$) over time for persistent values of $y_p$ within deadband section 2104.

Examples of PVDCs which may be used as a controller (e.g. controller 614, controller 714) according to the present disclosure are described in detail in U.S. patent application Ser. No. 15/619,203 filed on Jun. 9, 2017. The entire disclosure of this patent application is incorporated by reference herein.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for monitoring and controlling flow rate of a fluid through a valve, the system comprising:
a flow rate sensor configured to measure the flow rate of the fluid through the valve; and
a controller in communication with the flow rate sensor and configured to:
receive the measured flow rate from the flow rate sensor;
determine if the measured flow rate is equal to a predetermined flow rate value; and
in response to a determination that the measured flow rate is equal to the predetermined flow rate value:
determine a minimum valve position threshold ($x_{min}$);
determine a minimum flow rate threshold ($y_{min}$) corresponding to $x_{min}$;
generate a pulse-width modulated (PWM) signal;
calculate a corrected flow rate ($\hat{y}_f$) using the PWM signal; and
control a valve operation using the corrected flow rate ($\hat{y}_f$);
wherein the PWM signal is configured to switch between zero and $y_{min}$.

2. The system of claim 1, wherein the PWM signal is equal to zero when a pulse run time ($t_r$) is between a sum of a beginning of a pulse period ($t_k$) and a pulse width ($T_{on}$) and a sum of the beginning of the pulse period ($t_k$) and a pulse period (C).

3. The system of claim 1 wherein the PWM signal is equal to $y_{min}$ when a pulse run time ($t_r$) is between the beginning of a pulse period ($t_k$) and a sum of the beginning of the pulse period ($t_k$) and a pulse width ($T_{on}$).

4. The system of claim 3, wherein $T_{on}$ is less than or equal to the pulse period (C).

5. The system of claim 2, wherein n is a positive integer and $\tau_a$ is a stroke time corresponding to an actuator, and wherein C is equal to $n\tau_a$.

6. The system of claim 5, wherein n is equal to ten.

7. The system of claim 1, wherein the controller comprises a position detector configured to determine a position of the valve ($x_i$).

8. The system of claim 7, wherein the controller is configured to determine a pulse width ($T_{on}$) of the PWM signal, wherein the pulse width ($T_{on}$) is equal to $$\frac{x_i}{x_{min}} C$$

and C is a pulse period.

9. The system of claim 1, wherein the controller comprises a position detector configured to determine a position of the valve ($x_i$), and
in response to a determination that the measured flow rate is not equal to the predetermined flow rate value, the controller is configured to:
set $\hat{x}_{min}$ equal to a minimum value of $\hat{x}_{min}$ and $x_i$;
set $x_{min}$ equal to $\hat{x}_{min}$; and
in response to a determination that the measured flow rate is equal to the predetermined flow rate value, the controller is configured to:
set $\hat{x}_{min}$ equal to a maximum value of $\hat{x}_{min}$ and $x_i$; and
set $x_{min}$ equal to $\hat{x}_{min}$.

10. A system for monitoring and controlling flow rate of a fluid through a valve, the system comprising:
a valve configured to regulate a flow of a fluid through a conduit;
an actuator coupled to the valve and configured to drive the valve between multiple positions;
a flow rate sensor configured to measure the flow rate of the fluid through the valve; and
a controller in communication with the actuator and the flow rate sensor and configured to:
receive the measured flow rate;

determine if the measured flow rate is equal to zero;
in response to a determination that the measured flow rate is equal to zero:
   determine a minimum valve position threshold ($x_{min}$);
   determine a minimum flow rate threshold ($y_{min}$) using $x_{min}$;
   generate a pulse-width modulated (PWM) signal that switches between zero and $y_{min}$;
   calculate a corrected flow rate ($\hat{y}_f$) using the PWM signal;
   control a valve operation using the corrected flow rate; and
in response to a determination that the measured flow rate is greater than zero:
   control the valve operation using the measured flow rate.

11. The system of claim 10, wherein the controller is further configured to:
   determine if $t_k < t_r \leq (t_k + T_{on})$ where $t_k$ is a beginning of a pulse period, $t_r$ is a run time, and $T_{on}$ is a pulse width;
   determine if $(t_k + T_{on}) < t_r \leq (t_k + C)$ where C is a pulse period;
   in response to a determination that $t_k < t_r \leq (t_k + T_{on})$:
      set the PWM signal equal to $y_{min}$; and
   in response to a determination that $(t_k + T_{on}) < t_r \leq (t_k + C)$:
      set the PWM signal equal to zero.

12. The system of claim 11, wherein n is a positive integer and $\tau_a$ is a stroke time corresponding to the actuator, and wherein C is equal to $n\tau_a$.

13. The system of claim 10, wherein the controller comprises a position detector configured to determine a position of the valve ($x_i$).

14. The system of claim 13, wherein a pulse width ($T_{on}$) is equal to $$\frac{x_i}{x_{min}} C$$

and C is a pulse period.

15. The system of claim 10, wherein, in response to a determination that the measured flow rate is not equal to 0, the controller is configured to:
   set $\hat{x}_{min}$ equal to a minimum value of $\hat{x}_{min}$ and $x_i$;
   set $x_{min}$ equal to $\hat{x}_{min}$; and
   in response to a determination that the measured flow rate is equal to 0, the controller is configured to:
   set $\hat{x}_{min}$ equal to a maximum value of $\hat{x}_{min}$ and $x_i$; and
   set $x_{min}$ equal to $\hat{x}_{min}$.

16. A method for monitoring and controlling flow rate of a fluid through a valve, the method comprising:
   measuring the flow rate;
   determining if the flow rate is equal to zero; and
   in response to a determination that the flow rate is equal to zero:
      determining a valve opening position ($x_i$);
      determining a minimum valve position threshold ($x_{min}$);
      determining a minimum flow rate threshold ($y_{min}$) corresponding to $x_{min}$;
      calculating a corrected flow rate ($\hat{y}_f$) using a pulse-width modulated (PWM) signal, wherein the PWM signal is configured to switch between zero and $y_{min}$; and
      controlling a valve operation using the corrected flow rate ($\hat{y}_f$).

17. The method of claim 16 further comprising:
   in response to a determination that the flow rate is not equal to zero:
      determining an estimated minimum valve position threshold ($\hat{x}_{min}$); and
      setting $\hat{x}_{min}$ equal to a minimum value of $\hat{x}_{min}$ and $x_i$;
   in response to a determination that the flow rate is equal to zero:
      determining the estimated minimum valve position threshold ($\hat{x}_{min}$); and
      setting $\hat{x}_{min}$ equal to a maximum value of $\hat{x}_{min}$ and $x_i$;
   initializing a filtered estimate ($\bar{x}_{min}$) to $\hat{x}_{min}$;
   filtering $\hat{x}_{min}$ using a filtering equation comprising $$\bar{x}_{min} = \bar{x}_{min} + e^{-h/\tau_c}(\bar{x}_{min} - \hat{x}_{min})$$

where h is a sample rate and $\tau_c$, is a time constant;
   setting $\hat{x}_{min}$ equal to $\bar{x}_{min}$; and
   setting $x_{min}$ equal to $\hat{x}_{min}$.

18. The method of claim 16, further comprising generating the PWM signal by:
   determining if $t_k < t_r \leq (t_k + T_{on})$ where $t_k$ is a beginning of a pulse period, $t_r$ is a run time, and $T_{on}$ is a pulse width;
   determining if $(t_k + T_{on}) < t_r \leq (t_k + C)$ where C is a pulse period;
   in response to a determination that $t_k < t_r \leq (t_k + T_{on})$:
      setting the PWM signal equal to $y_{min}$; and
   in response to a determination that $(t_k + T_{on}) < t_r \leq (t_k + C)$:
      setting the PWM signal equal to zero.

19. The method of claim 18, wherein the pulse width ($T_{on}$) is equal to $$\frac{x_i}{x_{min}} C.$$

20. The method of claim 18, wherein n is a positive integer and $\tau_a$ is a stroke time corresponding to an actuator, and wherein C is equal to $n\tau_a$.

* * * * *